US012579658B2

(12) United States Patent (10) Patent No.: US 12,579,658 B2

Higashibara (45) Date of Patent: Mar. 17, 2026

(54) SIGNAL PROCESSING DEVICE, SIGNAL PROCESSING METHOD, AND SIGNAL PROCESSING SYSTEM

(71) Applicant: SONY SEMICONDUCTOR SOLUTIONS CORPORATION, Kanagawa (JP)

(72) Inventor: Kiyoshi Higashibara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 299 days.

(21) Appl. No.: 18/260,250

(22) PCT Filed: Dec. 21, 2021

(86) PCT No.: PCT/JP2021/047163

§ 371 (c)(1),
(2) Date: Jul. 3, 2023

(87) PCT Pub. No.: WO2022/153795

PCT Pub. Date: Jul. 21, 2022

(65) Prior Publication Data

US 2024/0054656 A1 Feb. 15, 2024

(30) Foreign Application Priority Data

Jan. 12, 2021 (JP) ................................. 2021-002942

(51) Int. Cl.
*G06T 7/20* (2017.01)
*G06V 10/141* (2022.01)
(Continued)

(52) U.S. Cl.
CPC .............. *G06T 7/20* (2013.01); *G06V 10/141* (2022.01); *G06V 10/761* (2022.01); *G06V 20/56* (2022.01)

(58) Field of Classification Search
CPC ...... G06T 7/20; G06V 10/141; G06V 10/761; G06V 20/56
See application file for complete search history.

(56) References Cited

U.S. PATENT DOCUMENTS

| 2007/0055446 | A1* | 3/2007 | Schiffmann | ........... G01S 13/867 |
| | | | | 701/301 |
| 2018/0324415 | A1* | 11/2018 | Bovyrin | ............... G06V 20/582 |

(Continued)

FOREIGN PATENT DOCUMENTS

| JP | 2012-074777 A | 4/2012 |
| JP | 5173551 B2 | 4/2013 |

(Continued)

OTHER PUBLICATIONS

English translation of JP2012074777A by Maekawa (Year: 2012).*

(Continued)

*Primary Examiner* — Utpal D Shah

(74) *Attorney, Agent, or Firm* — CHIP LAW GROUP

(57) ABSTRACT

Provided is a signal processing device that includes an optical flow detecting unit and an installation error calculating unit. The optical flow detecting unit detects an optical flow on the basis of an image captured by an imaging device installed on a vehicle. The installation error calculating unit calculates an amount of error in attitude of the imaging device on the basis of information on the optical flow.

17 Claims, 16 Drawing Sheets

(51) Int. Cl.
    *G06V 10/74*         (2022.01)
    *G06V 20/56*         (2022.01)

(56)             References Cited

U.S. PATENT DOCUMENTS

| | | | |
|---|---|---|---|
| 2018/0365859 A1* | 12/2018 | Oba | B60W 40/114 |
| 2019/0362160 A1* | 11/2019 | Torikura | G01B 11/26 |
| 2020/0097025 A1* | 3/2020 | Zhang | G05D 1/102 |
| 2020/0198646 A1* | 6/2020 | Sasaki | B60W 10/188 |
| 2020/0349723 A1* | 11/2020 | Geva | G06V 20/56 |
| 2022/0082407 A1* | 3/2022 | Shiota | G01C 21/3848 |
| 2022/0377261 A1* | 11/2022 | Whitely | G06T 7/73 |

FOREIGN PATENT DOCUMENTS

| | | |
|---|---|---|
| JP | 2018-007038 A | 1/2018 |
| JP | 6354425 B2 | 7/2018 |

OTHER PUBLICATIONS

Barnada, Marc, et al. "Estimation of automotive pitch, yaw, and roll using enhanced phase correlation on multiple far-field windows." 2015 IEEE Intelligent Vehicles Symposium (IV). IEEE, 2015. (Year: 2015).*
International Search Report and Written Opinion of PCT Application No. PCT/JP2021/047163, issued on Mar. 15, 2022, 09 pages of ISRWO.

\* cited by examiner

F I G . 1
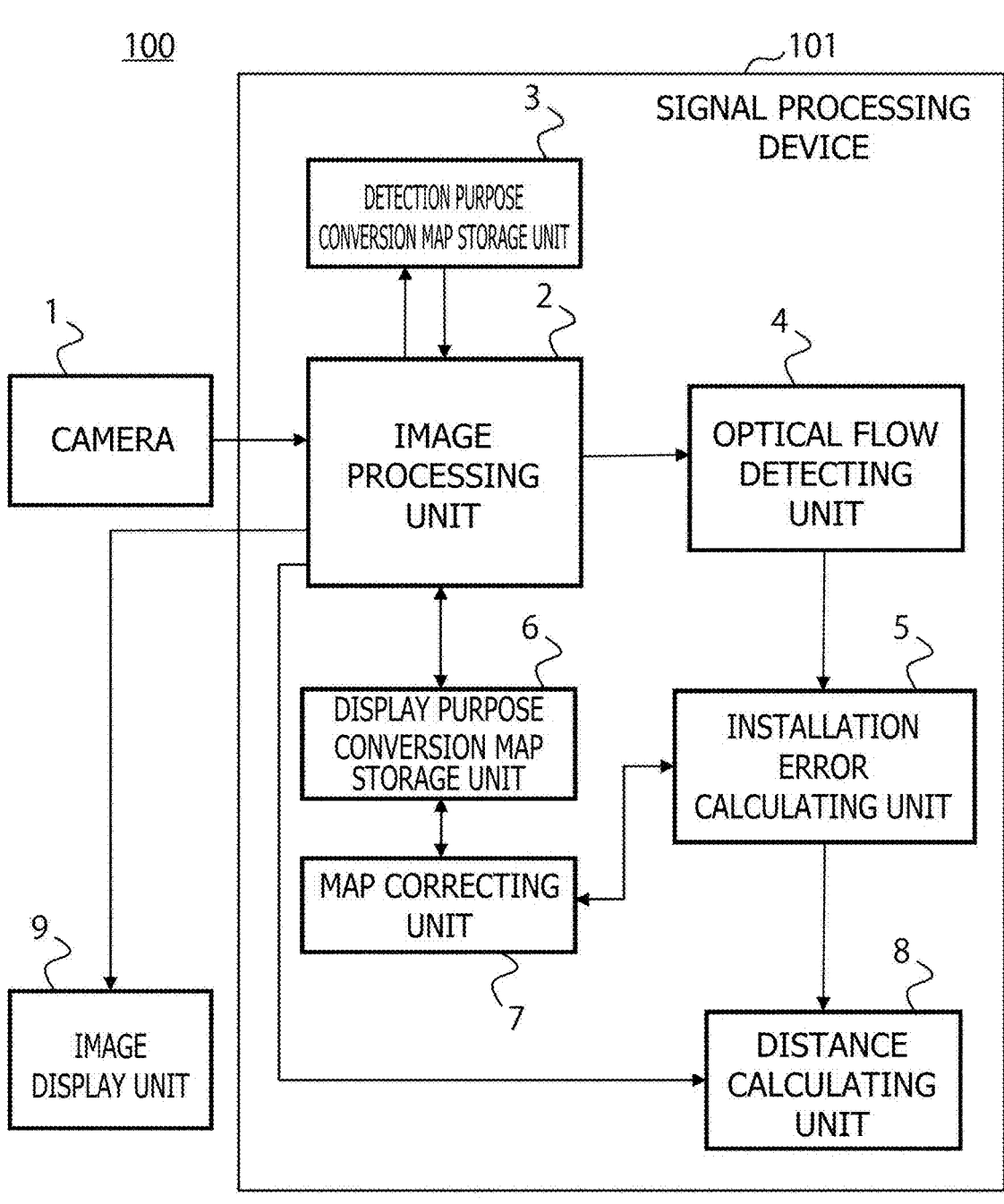

F I G . 2
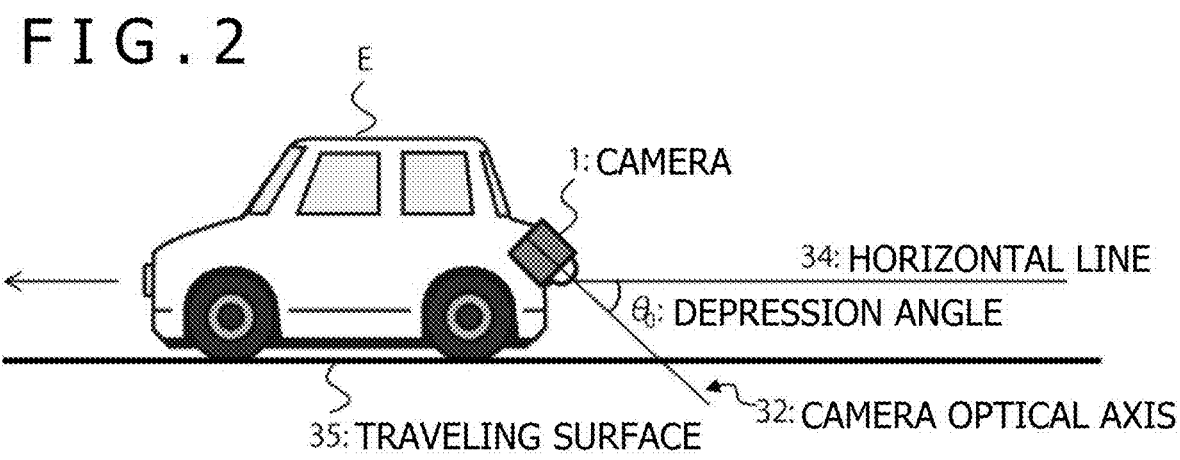
1: CAMERA
34: HORIZONTAL LINE
θ: DEPRESSION ANGLE
35: TRAVELING SURFACE       32: CAMERA OPTICAL AXIS
F I G . 3
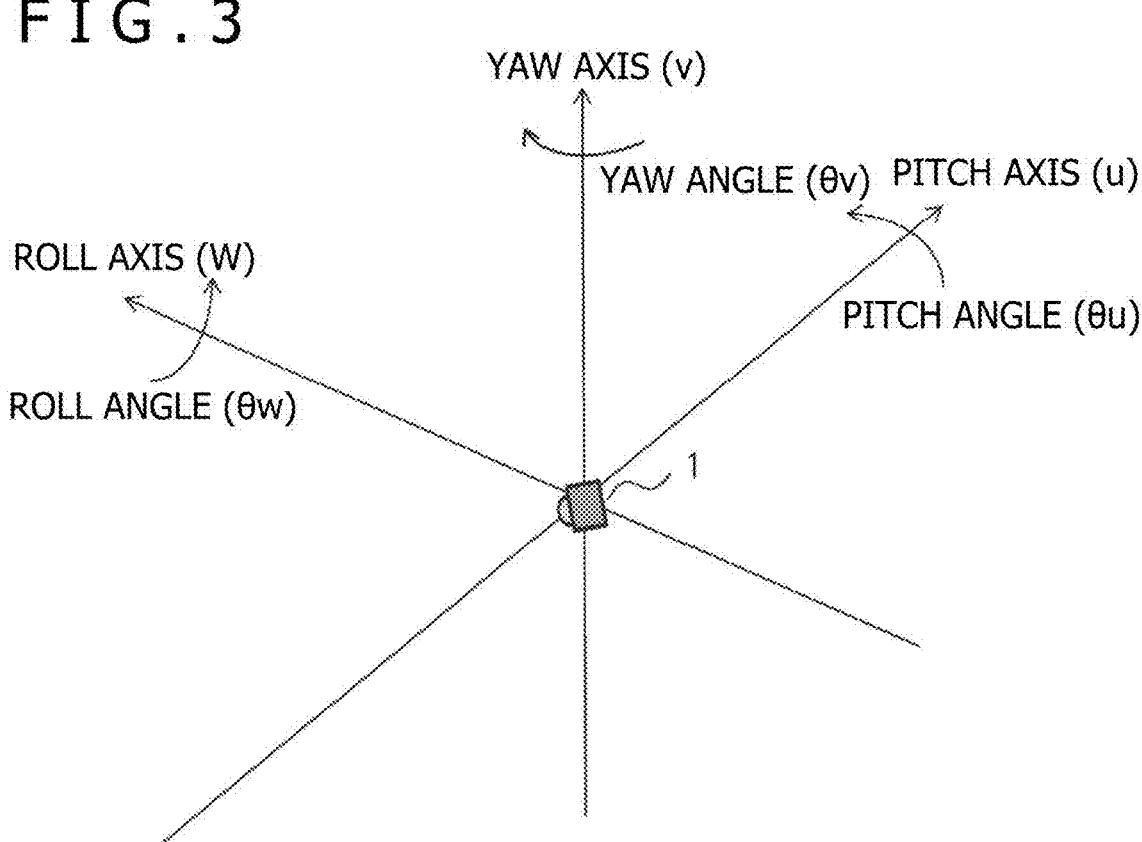
YAW AXIS (v)
YAW ANGLE (θv)   PITCH AXIS (u)
ROLL AXIS (W)
PITCH ANGLE (θu)
ROLL ANGLE (θw)
1
F I G . 4
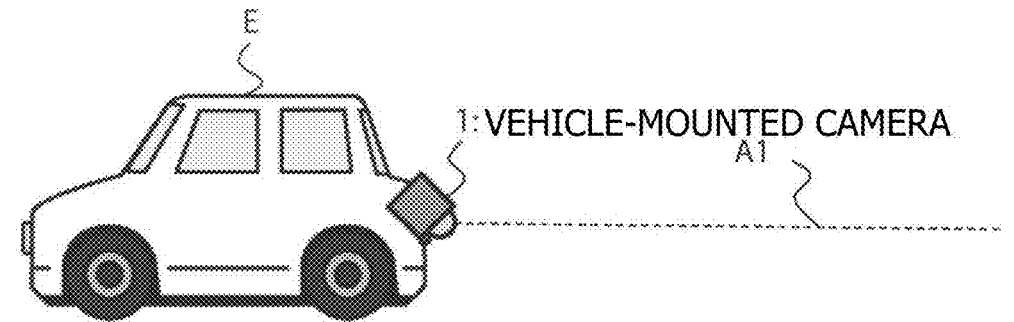
1: VEHICLE-MOUNTED CAMERA
A1

F I G . 9
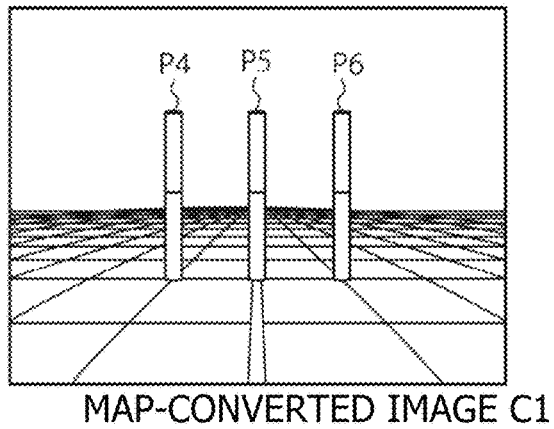
MAP-CONVERTED IMAGE C1
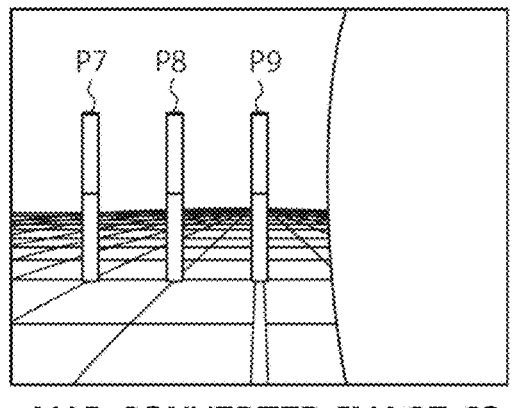
MAP-CONVERTED IMAGE C2
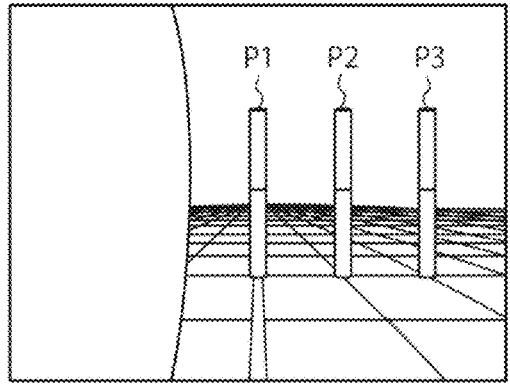
MAP-CONVERTED IMAGE C3
F I G . 1 0
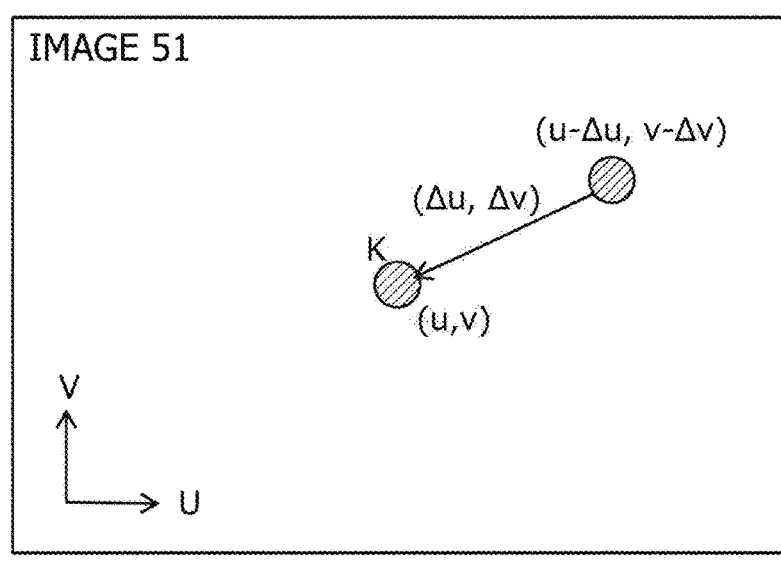

F I G . 1 3
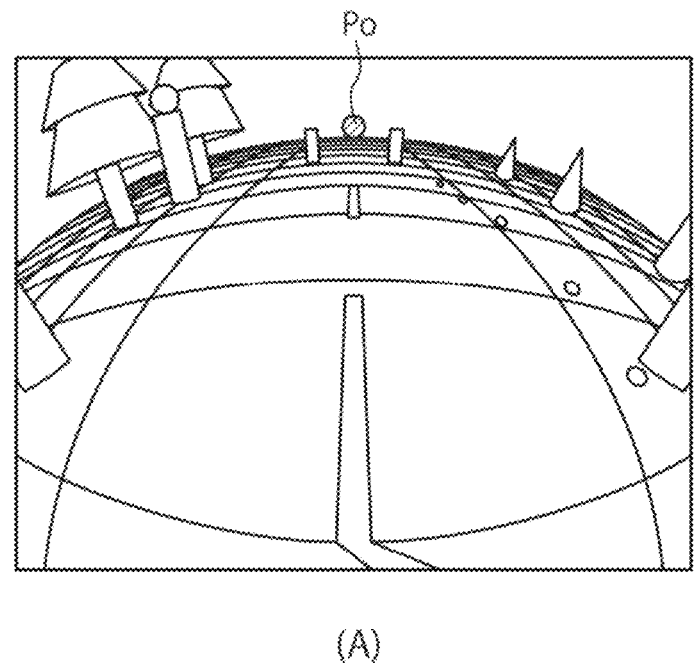
(A)
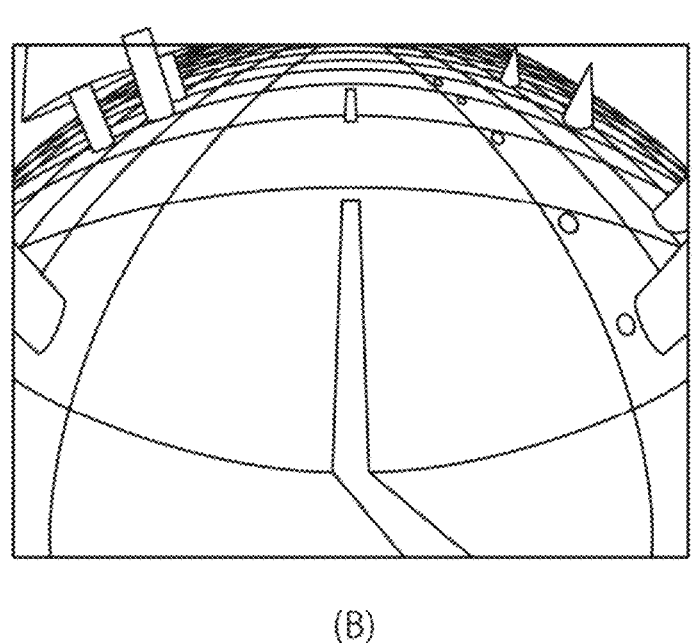
(B)

F I G . 1 4
(A)
MAP-CONVERTED
IMAGE C1
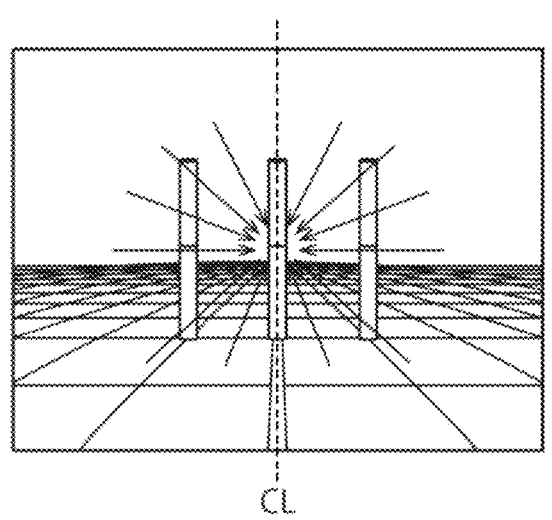
(B)
MAP-CONVERTED
IMAGE C2
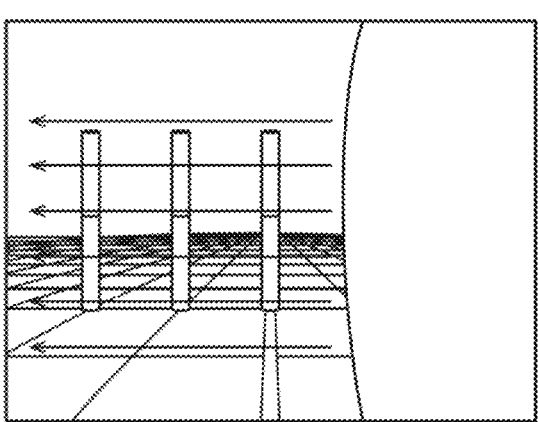
(C)
MAP-CONVERTED
IMAGE C3
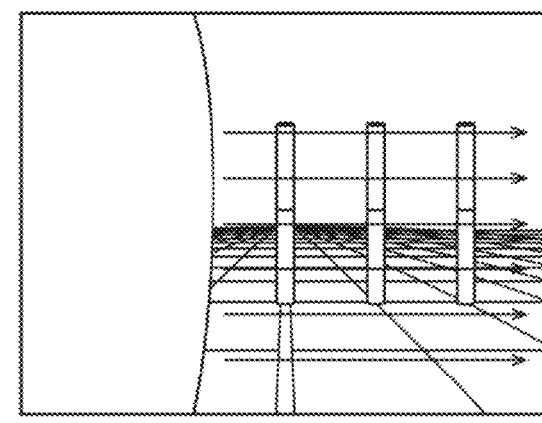

FIG.15
(A)
MAP-CONVERTED
IMAGE C1
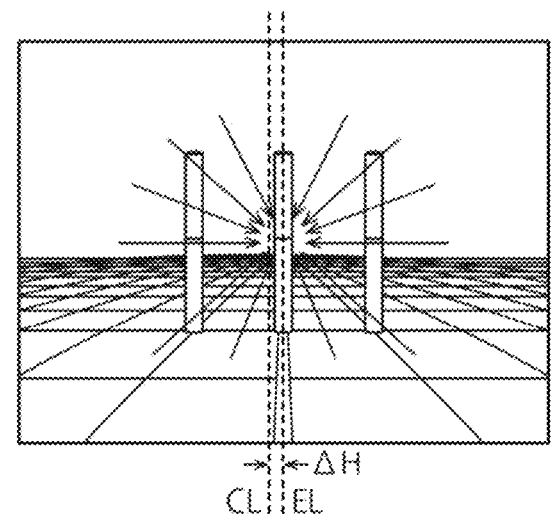
(B)
MAP-CONVERTED
IMAGE C2
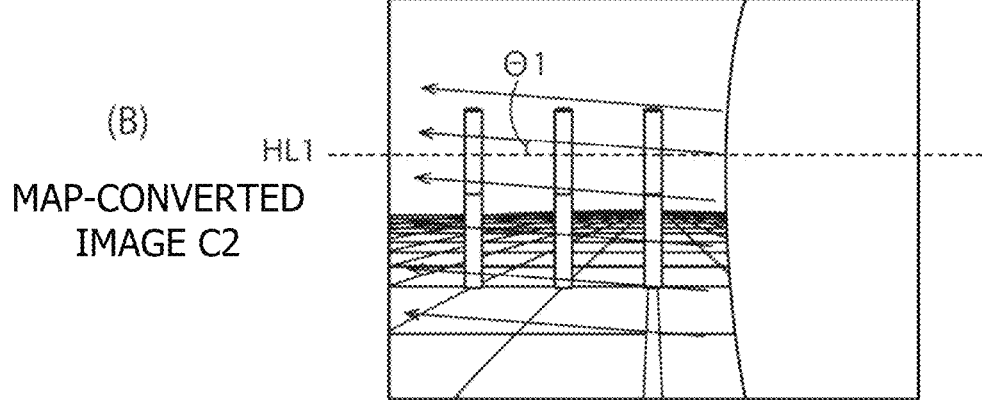
(C)
MAP-CONVERTED
IMAGE C3
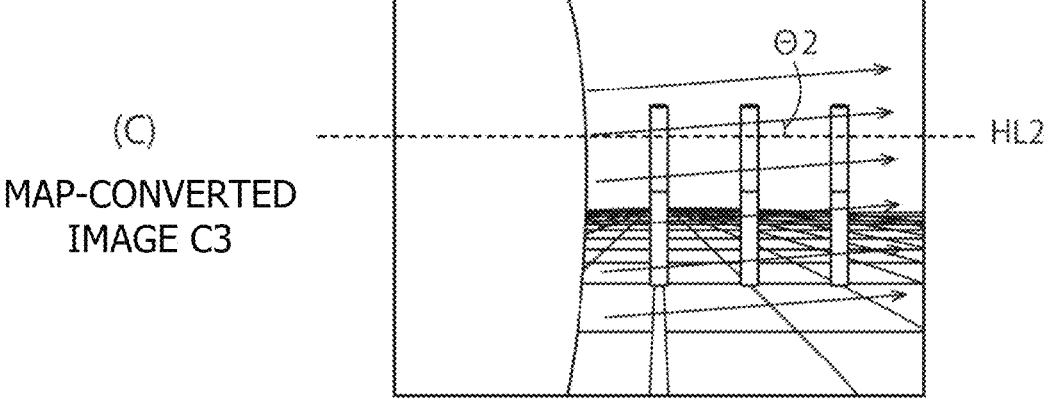

(A)

NO ERROR (B)

PITCH ANGLE:
DISPLACEMENT OF
THREE DEGREES (C)

YAW ANGLE:
DISPLACEMENT OF
THREE DEGREES (D)

YAW ANGLE:
DISPLACEMENT OF
THREE DEGREES

PITCH ANGLE:
DISPLACEMENT OF
THREE DEGREES

CL (A)

NO ERROR (B)

YAW ANGLE: DISPLACEMENT OF THREE DEGREES (C)

PITCH ANGLE: DISPLACEMENT OF THREE DEGREES (D)

YAW ANGLE: DISPLACEMENT OF THREE DEGREES PITCH ANGLE: DISPLACEMENT OF THREE DEGREES

HL1

F I G . 1 8
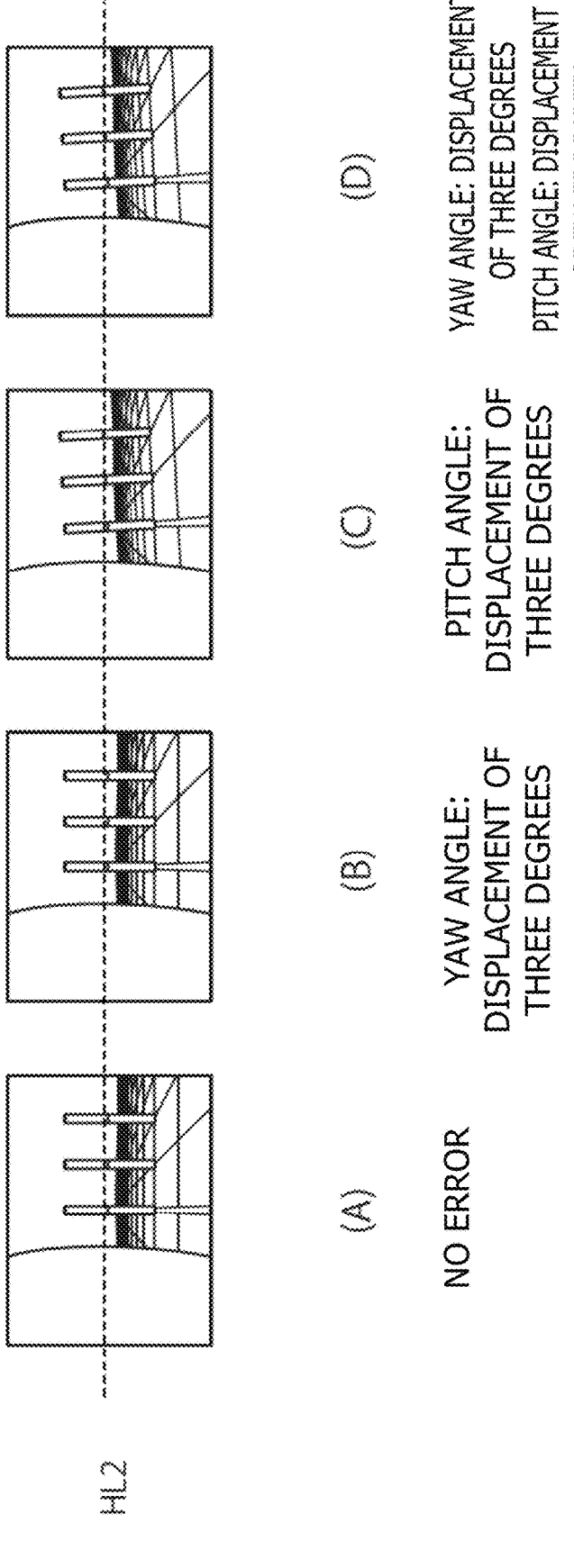
(A)   NO ERROR
(B)   YAW ANGLE: DISPLACEMENT OF THREE DEGREES
(C)   PITCH ANGLE: DISPLACEMENT OF THREE DEGREES
(D)   YAW ANGLE: DISPLACEMENT OF THREE DEGREES
      PITCH ANGLE: DISPLACEMENT OF THREE DEGREES
HL2

SIGNAL PROCESSING DEVICE, SIGNAL PROCESSING METHOD, AND SIGNAL PROCESSING SYSTEM

CROSS REFERENCE TO RELATED APPLICATIONS

This application is a U.S. National Phase of International Patent Application No. PCT/JP2021/047163 filed on Dec. 21, 2021, which claims priority benefit of Japanese Patent Application No. JP 2021-002942 filed in the Japan Patent Office on Jan. 12, 2021. Each of the above-referenced applications is hereby incorporated herein by reference in its entirety.

TECHNICAL FIELD

The present disclosure relates to a signal processing device, a signal processing method, and a signal processing system.

BACKGROUND ART

There is a camera system in which cameras are installed on the front and rear and side surfaces of a vehicle and images captured by the cameras are displayed on a monitor at a driver's seat. The camera system presents, to a driver, surrounding conditions that cannot be viewed from the driver's seat. The camera system can thereby assist in driving.

An error in the installation of a camera (installation error of the camera) may occur when the camera is installed onto the vehicle. For example, an error may occur in an installation angle of the camera (attitude of the camera). When the error occurs, a displacement occurs between an imaging region of the camera and a correct original imaging region.

In some camera systems, the monitor viewed by the driver may display auxiliary lines such as a guide line and a predicted traveling path line in a state of being superimposed on the image captured by the camera. When the imaging region is displaced due to the installation error of the camera, the guide line and the predicted traveling path line are displayed at positions displaced from actual positions.

In addition, in recent years, the vehicle-mounted cameras are used not only for monitoring by the driver but also driving assistance functions and automated driving functions of a vehicle system. For example, the vehicle system detects a target object such as an obstacle or a pedestrian from an image captured by a camera, measures a distance to the target object, and sends a result of the estimation to a driving unit on a vehicle side. On the basis of the estimation result, the driving unit performs control of notifying a warning to the driver, operating automatic brakes, or the like.

The measurement of the distance is affected by a displacement in the installation angle of the camera. Thus, in a case where the camera is not installed according to predetermined design, that is, without errors, an accurate distance cannot be measured.

As a method for detecting an installation error of the camera, a method is known which uses an image obtained by imaging a calibration chart (for example, an image of a checkered pattern) as a reference image. This method images the calibration chart by the camera installed on the vehicle, and calculates a displacement between the captured image and the image captured by a camera (ideal image).

The installation position and angle of the camera are adjusted so as to reduce the displacement.

More specifically, the installation of the camera is determined by six parameters, that is, three-dimensional positions (X, Y, Z) and optical axis directions of the camera (a yaw angle, a pitch angle, and a roll angle). Displacement amounts of the six components are obtained by, for example, comparing the calibration chart (reference image) obtained in a case of performing imaging at the positions and the angles determined by the six parameters with the image captured by the actual camera, and computing a difference between the two images.

However, in a case of a wide-angle lens camera such as a vehicle-mounted camera, an amount of displacement of video is small with respect to an amount of displacement of the camera, and therefore, highly accurate detection is difficult. In addition, a calculating method is complex.

There is also a method of detecting an installation error of the camera without using the calibration chart. For example, there is a method of detecting the installation error of the camera on the basis of a vanishing point obtained from an image captured during traveling. However, the vanishing point may not be present in some images. In this case, the installation error of the camera cannot be detected.

CITATION LIST

Patent Literature

[PTL 1]
Japanese Patent No. 5173551
[PTL 2]
Japanese Patent No. 6354425

SUMMARY

Technical Problems

The present disclosure provides a signal processing device, a signal processing method, and a signal processing system that detect an installation error of an imaging device by simple processing.

Solution to Problems

According to the present disclosure, there is provided a signal processing device including an optical flow detecting unit configured to detect an optical flow on the basis of an image captured by an imaging device installed on a vehicle, and an installation error calculating unit configured to calculate an amount of error in attitude of the imaging device on the basis of information on the optical flow.

According to the present disclosure, there is provided a signal processing method including detecting an optical flow on the basis of an image captured by an imaging device installed on a vehicle, and calculating an amount of error in attitude of the imaging device on the basis of information on the optical flow.

According to the present disclosure, there is provided a signal processing system including an imaging unit installed on a vehicle, an optical flow detecting unit configured to detect an optical flow on the basis of an image captured by the imaging unit, an installation error calculating unit configured to calculate an amount of error in attitude of the imaging unit on the basis of information on the optical flow, an image generating unit configured to generate a display image on the basis of the amount of error in the attitude and the image captured by the imaging unit, and an image display unit configured to display the display image.

BRIEF DESCRIPTION OF DRAWINGS

FIG. 1 is a block diagram of an example of a signal processing system according to the present disclosure.

FIG. 2 is a diagram illustrating a vehicle mounted with the signal processing system of FIG. 1 from a side.

FIG. 3 is a diagram conceptually illustrating a uvw coordinate system.

FIG. 4 is a diagram illustrating an example of a virtual optical axis A1 corresponding to a roll axis direction of a camera.

FIG. 9 depicts diagrams illustrating examples of map-converted images obtained by converting the image of FIG. 8 by detection purpose conversion maps.

FIG. 10 is a diagram of assistance in explaining processing of detecting an optical flow.

FIGS. 13A and 13B depict diagrams illustrating an example of an image in which a vanishing point is present and an example of an image in which the vanishing point is not present.

FIGS. 14A, 14B, and 14C depict diagrams illustrating examples of optical flows in a case where the camera has no installation error.

FIGS. 15A, 15B, and 15C depict diagrams illustrating examples of optical flows in a case where the camera has installation errors in yaw angle and pitch angle.

FIGS. 18A, 18B, 18C, and 18D are diagrams illustrating a plurality of examples of a positional relation between a map-converted image C3 and the horizontal line.

DESCRIPTION OF EMBODIMENTS

Figure 5:
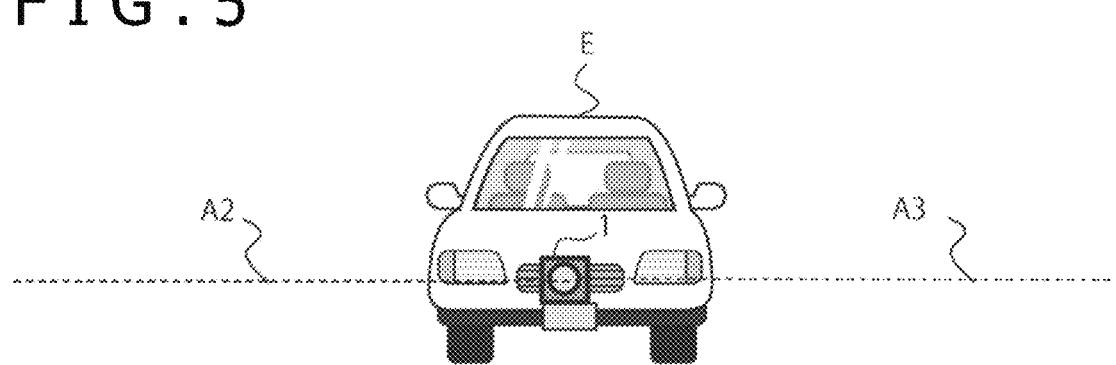
FIG. 5 is a diagram illustrating an example of a virtual optical axis A2 corresponding to a pitch axis direction of the camera and a virtual optical axis A3 corresponding to a negative direction of the pitch axis.

Embodiments of the present disclosure will hereinafter be described with reference to the drawings. In one or more embodiments illustrated in the present disclosure, elements included in each embodiment can be combined with each other, and resultant products obtained by combining the elements also constitute a part of the embodiments disclosed by the present disclosure.

First Embodiment

FIG. 1 is a block diagram illustrating an example of a signal processing system 100 according to a first embodiment of the present disclosure. The signal processing system 100 of FIG. 1 can be mounted in a vehicle such as an automobile, an electric vehicle, a hybrid electric vehicle, a motorcycle, or a bicycle. However, the technology according to the present disclosure can also be implemented as a device mounted in a moving body of any one of the following kinds: an AGV (Automated Guided Vehicle), a personal mobility vehicle, an airplane, a drone, a vessel, a mobile robot, a construction machine, an agricultural machine (tractor), or the like.

The signal processing system 100 of FIG. 1 includes a camera 1, an image display unit 9, and a signal processing device 101. At least one of the camera 1 and the image display unit 9 may be included in the signal processing device 101. The signal processing device 101 includes an image processing unit 2, a detection purpose conversion map storage unit 3, an optical flow detecting unit 4, an installation error calculating unit 5, a display purpose conversion map storage unit 6, a map correcting unit 7, and a distance calculating unit 8. The configurations of the signal processing system 100 in FIG. 1 are connected to each other by a communication network. This communication network may, for example, be a vehicle-mounted communication network complying with an optional standard, such as a CAN (Controller Area Network), a LIN (Local Interconnect Network), a LAN (Local Area Network), or FlexRay (registered trademark). The constituent elements 2 to 8 in FIG. 1 are typically constituted by an ECU (Electronic Control Unit).

FIG. 2 illustrates an example in which a vehicle mounted with the signal processing system 100 of FIG. 1 is illustrated from a side. The camera 1 in FIG. 1 is a vehicle-mounted camera installed on a rear portion of a vehicle E. The image display unit 9 in FIG. 1 is disposed in such a position as to be visible from a driver inside the vehicle. However, the technology according to the present disclosure is applicable not only to manned automobiles but also to unmanned automobiles. In this case, a configuration without the image display unit 9 is also possible. An installation error of the camera 1 will be described in the following.

Suppose that a line parallel with the traveling direction of the vehicle or an opposite direction thereto and parallel with a traveling surface 35 of the vehicle from a light source of the camera 1 is set to be a horizontal line 34. The horizontal line is an imaginary line and is not actually present. The camera 1 is installed so as to be oriented in a downward direction at a depression angle $\theta_0$ with respect to the horizontal line 34. The depression angle $\theta_0$ is an angle formed between the horizontal line 34 and a camera optical axis 32 of the camera 1. When the camera 1 is oriented in the downward direction with respect to the horizontal line 34, a part of a body of the vehicle E is displayed on a screen, and therefore, the driver easily has a sense of distance between the vehicle E and a target object at a time of backing the vehicle. However, the camera 1 may be oriented in a direction parallel with the horizontal line 34, or may be oriented in an upward direction with respect to the horizontal line 34. An image captured by the camera 1 is converted in the signal processing system 100 into a display image for presentation to an occupant (user such as the driver), is thereafter sent to the image display unit 9, and is then displayed on the image display unit 9.

In a case where the camera 1 is installed according to design values, the installation error (amounts of displacement in position and angle) of the camera 1 is zero. In a case where the camera 1 is not installed according to the design values, there is an amount of displacement in at least one of the installation position or angle of the camera 1 (which amount of displacement will be referred to as an amount of error). An error in the installation position of the camera 1 occurs as an error in position in a real coordinate system defined by a horizontal direction, a forward-rearward direction, and a vertical direction (an x-axis, a y-axis, and a z-axis). An error in the installation angle occurs as an error in at least one of a pitch angle ($\theta u$), a yaw angle ($\theta v$), and a roll angle ($\theta w$) in a uvw coordinate system. In the present embodiment, description will mainly be of a case where there is an error in the pitch angle or the yaw angle.

The uvw coordinate system will be described with reference to FIG. 3. FIG. 3 is a diagram conceptually illustrating the uvw coordinate system. The uvw coordinate system of three dimensions is defined with the light source of the camera 1 at a center. Three directions obtained by respectively inclining the horizontal direction, the forward-rearward direction, and the vertical direction (the x-axis, the y-axis, and the z-axis) defining the real coordinate system about respective axes by inclinations about the respective axes of the camera 1 in the real coordinate system are set as a pitch axis (u-axis), a yaw axis (v-axis), and a roll axis (w-axis) of the uvw coordinate system in the camera 1. In the present embodiment, a direction parallel with the traveling direction of the vehicle and parallel with the traveling surface as viewed from the light source of the camera 1 in a case where the camera 1 is installed according to the design values corresponds to the roll axis direction of the uvw coordinate system. The pitch angle ($\theta u$) represents an angle of inclination of the camera 1 about the pitch axis. The yaw angle ($\theta v$) represents an angle of inclination of the camera 1 about the yaw axis. The roll angle ($\theta w$) represents an angle of inclination of the camera 1 about the roll axis. In a case where the depression angle $\theta_0$ of the installed camera 1 is 40 degrees, the pitch angle is 40 degrees. When the design value of the pitch angle is 40 degrees and an actual pitch angle is 43 degrees, an amount of displacement in the pitch angle is 3 degrees. An amount of displacement is similarly defined for the yaw angle or the like.

Suppose that the camera 1 is installed according to the design values, that is, for example, the camera 1 is installed on a center of the rear portion of the vehicle E at a depression angle of 40 degrees, at a yaw angle of 0 degrees and a roll angle of 0 degrees, and at a position of a height of 1 m from the traveling surface. In this case, a direction parallel with the traveling direction of the vehicle and parallel with the traveling surface coincides with the roll axis direction of the camera 1. One of two directions orthogonal to the roll axis direction and parallel with the traveling surface corresponds to a pitch axis direction, and the other corresponds to a negative direction of the pitch axis. In a case where an installation angle (for example, the pitch angle) of the camera 1 is shifted from the design value by 3 degrees, the pitch axis in the camera 1 is displaced by 3 degrees with respect to the pitch axis in a case where the camera 1 is installed according to the design value (direction parallel with the traveling direction of the vehicle and parallel with the traveling surface).

The installation error of the camera 1 has been described above. In the following, the signal processing system 100 of FIG. 1 will be described in detail.

The camera 1 in FIG. 1 is an imaging device or an imaging unit that images a surrounding environment including the rear of the vehicle E. The camera 1 obtains image data including luminance information for each pixel by imaging. The camera 1 is, for example, an RGB camera, a monochrome camera, an infrared, or the like, but is not limited thereto. The camera 1 may be a monocular camera or a compound-eye camera. In the present example, the camera 1 is assumed to be a monocular RGB camera using a wide-angle lens. The camera 1 provides a captured image to the image processing unit 2. Specifically, the camera 1 performs imaging at a fixed sampling rate, and sequentially provides images of a plurality of frames in time series to the image processing unit 2.

The image processing unit 2 is connected to the camera 1. The image processing unit 2 receives the images of the plurality of frames provided from the camera 1 at fixed time intervals (images in time series), and processes the received images. The image processing unit 2 converts the received images into images of three viewpoints in three directions (virtual optical axes). Specific details are as follows.

The image processing unit 2 converts a received image into an image of a first viewpoint. The first viewpoint is a viewpoint in the roll axis direction, and is a viewpoint in a direction at a pitch angle of zero degrees and a yaw angle of zero degrees. That is, in a case where a virtual optical axis extending in the roll axis direction (suppose that the virtual optical axis is a virtual optical axis A1) is defined, the image in the direction of the camera optical axis 32 (see FIG. 2) is converted into an image in the direction of the virtual optical axis A1.

FIG. 4 illustrates an example of the virtual optical axis A1 extending in the roll axis direction (direction at a pitch angle of zero degrees and a yaw angle of zero degrees) from the light source of the camera 1. The virtual optical axis A1 is an axis corresponding to the direction parallel with the traveling direction of the vehicle and parallel with the traveling surface in a case where the camera 1 is assumed to have no installation error in the pitch angle (depression angle). That is, in this case, the virtual optical axis A1 is parallel with the horizontal line 34 in FIG. 2. In a case where there is assumed to be an error in the pitch angle (depression angle), however, the virtual optical axis A1 is inclined by an angle corresponding to the error with respect to the horizontal line 34.

In addition, the image processing unit 2 converts the image received from the camera 1 into an image of a second viewpoint. The second viewpoint is a viewpoint in a direction at a pitch angle of 0 degrees and a yaw angle of 90 degrees (the yaw angle of 90 degrees corresponds to the positive direction of the pitch axis). That is, in a case where a virtual optical axis extending in the pitch axis direction (suppose that the virtual optical axis is a virtual optical axis A2) is defined, the image in the direction of the camera optical axis 32 is converted into an image in the direction of the virtual optical axis A2.

FIG. 5 illustrates an example of the virtual optical axis A2 extending in the pitch axis direction (direction at a pitch angle of 0 degrees and a yaw angle of 90 degrees) from the light source of the camera 1. FIG. 5 illustrates a state in which the vehicle is viewed from the rear. The virtual optical axis A2 is an axis in a direction perpendicular to the traveling direction of the vehicle and parallel with the traveling surface in a case where the camera 1 is assumed to have no installation error in the yaw angle. That is, in this case, the virtual optical axis A2 is perpendicular to the horizontal line 34 in FIG. 2 and parallel with the traveling surface. In a case where there is assumed to be an error in the yaw angle, however, the virtual optical axis A2 is inclined by an angle corresponding to the error with respect to the direction perpendicular to the traveling direction of the vehicle.

In addition, the image processing unit 2 converts the image received from the camera 1 into an image of a third viewpoint. The third viewpoint is a viewpoint in a direction at a pitch angle of 0 degrees and a yaw angle of –90 degrees (the –90 degrees corresponding to the negative direction of the pitch axis). That is, in a case where a virtual optical axis extending in the negative direction of the pitch axis (suppose that the virtual optical axis is a virtual optical axis A3) is defined, the image in the direction of the camera optical axis 32 is converted into an image in the direction of the virtual optical axis A3.

FIG. 5 described above illustrates an example of the virtual optical axis A3 extending in the negative direction of the pitch axis (direction at a pitch angle of 0 degrees and a yaw angle of –90 degrees) from the light source of the camera 1. The virtual optical axis A3 is an axis in a direction perpendicular to the traveling direction of the vehicle and parallel with the traveling surface in a case where the camera 1 is assumed to have no installation error in the yaw angle. That is, in this case, the virtual optical axis A3 is perpendicular to the horizontal line 34 in FIG. 2 and parallel with the traveling surface. In a case where there is assumed to be an error in the yaw angle, however, the virtual optical axis A3 is inclined by an angle corresponding to the error with respect to the direction perpendicular to the traveling direction of the vehicle.

Incidentally, the definitions of the second viewpoint and the third viewpoint described above may be reversed. That is, the second viewpoint may be set as a viewpoint corresponding to the virtual optical axis A3, and the third viewpoint may be set as a viewpoint corresponding to the virtual optical axis A2.

The image processing unit 2 uses detection purpose conversion maps M1, M2, and M3 stored in the detection purpose conversion map storage unit 3 in order to convert the image captured by the camera 1 into images of the three viewpoints (three virtual optical axes A1, A2, and A3) described above.

The detection purpose conversion map storage unit 3 stores the detection purpose conversion maps M1 to M3. The detection purpose conversion map M1 is conversion information for converting the image of the camera 1 into an image of the first viewpoint (virtual optical axis A1) (image geometric transformation). The detection purpose conversion map M2 is conversion information for converting the image of the camera 1 into an image of the second viewpoint (virtual optical axis A2). The detection purpose conversion map M3 is conversion information for converting the image of the camera 1 into an image of the third viewpoint (virtual optical axis A3). The detection purpose conversion map storage unit 3 is a recording medium such as a memory device, a hard disk, or an optical disk. The memory device may be a nonvolatile memory or may be a volatile memory.

The detection purpose conversion map M1 defines which pixel of the image of the camera 1 is to be mapped to which pixel of the image in the direction of the virtual optical axis A1. The mapping between the pixels may be one-to-one mapping. Alternatively, a plurality of pixels in the image of the camera 1 may be mapped to one pixel in the image in the direction of the virtual optical axis A1. In this case, a computed value of the values of the plurality of pixels (for example, a value obtained by multiplying the plurality of pixels by a filter), for example, is mapped to one pixel. The detection purpose conversion map M1 may be correspondence information that associates a pixel value before conversion with a pixel value after the conversion in a look-up table or the like. Alternatively, the detection purpose conversion map M1 may be a function (conversion function) that receives, as input, the value(s) of one or more pixels in the image of the camera 1, and outputs the value of one pixel in the image in the direction of the virtual optical axis A1. The detection purpose conversion map M1 can be generated by use of, for example, image geometric transformation (for example, affine transformation) based on parameters (external parameters and internal parameters) of the camera 1. The detection purpose conversion map M2 and the detection purpose conversion map M3 can also be generated in a similar manner to the detection purpose conversion map M1.

The image processing unit 2 reads the detection purpose conversion map M1 from the detection purpose conversion map storage unit 3, and converts the image captured by the camera 1 into an image of the first viewpoint (image in the direction of the virtual optical axis A1) on the basis of the detection purpose conversion map M1. Similarly, the image processing unit 2 reads the detection purpose conversion map M2 from the detection purpose conversion map storage unit 3, and converts the image captured by the camera 1 into an image of the second viewpoint (image in the direction of the virtual optical axis A2) on the basis of the detection purpose conversion map M2. Further, the image processing unit 2 reads the detection purpose conversion map M3 from the detection purpose conversion map storage unit 3, and converts the image captured by the camera 1 into an image of the third viewpoint (image in the direction of the virtual optical axis A3) on the basis of the detection purpose conversion map M3.

In the following, the image converted by the detection purpose conversion map M1 (image in the direction of the virtual optical axis A1) will be described as a map-converted image C1, the image converted by the detection purpose conversion map M2 (image in the direction of the virtual optical axis A2) will be described as a map-converted image C2, and the image converted by the detection purpose conversion map M3 (image in the direction of the virtual optical axis A3) will be described as a map-converted image C3.

Operation of the image processing unit 2 will be described specifically in the following with reference to FIGS. 6 to 9.

Figure 6:
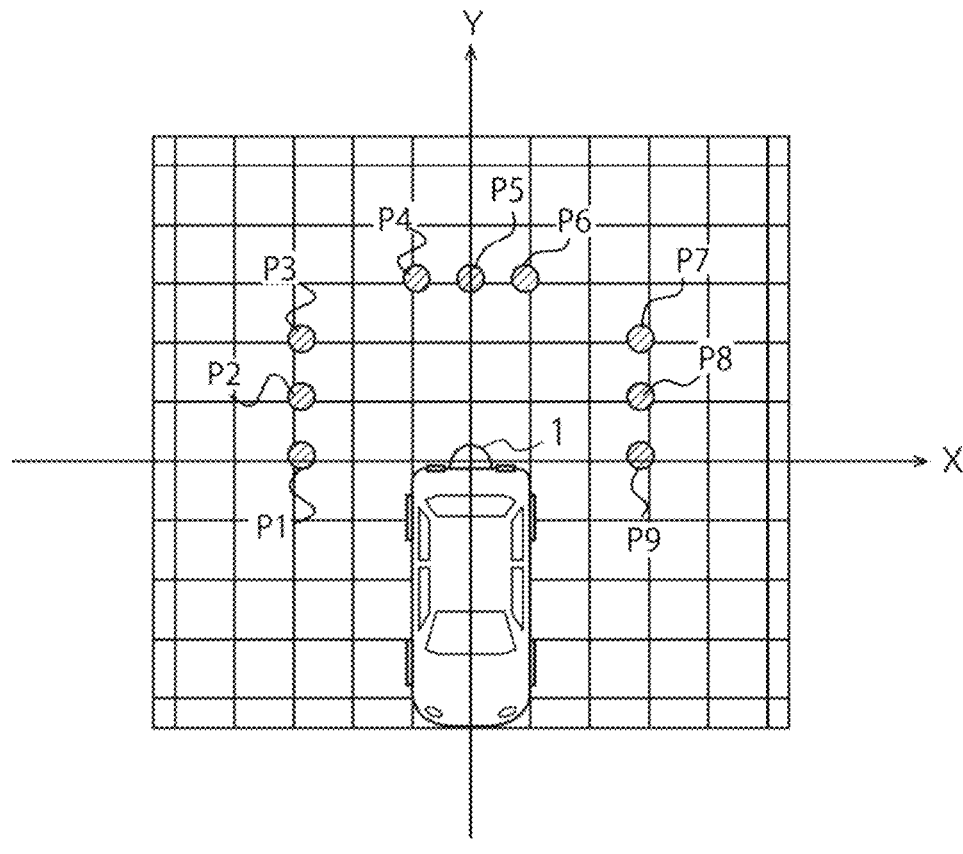
FIG. 6 is a diagram illustrating, in plan, a positional relation between the camera and subjects.

FIG. 6 is a diagram illustrating, in plan, a positional relation of the camera 1 to eight circular cylinders P1 to P8 as subjects.

Figure 7:
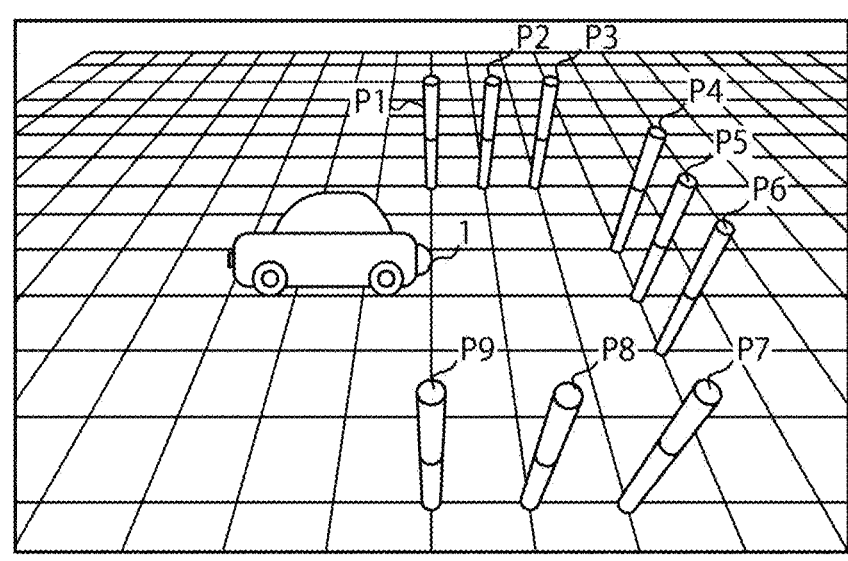
FIG. 7 is a diagram in which the same state as in FIG. 6 is viewed from obliquely above a side of the vehicle.

FIG. 7 is a diagram in which the same state as in FIG. 6 is viewed from obliquely above a side of the vehicle E.

A case where the vehicle E travels forward is assumed, and suppose that an opposite direction from the traveling direction of the vehicle E is a y-axis positive direction. Suppose that a direction parallel with the traveling surface, orthogonal to the y-axis, and at 90 degrees on a right side as viewed from the vehicle E is an x-axis negative direction. Suppose that a direction parallel with the traveling surface, orthogonal to the y-axis, and at 90 degrees on a left side as viewed from the vehicle E is an x-axis positive direction. Supposing that the position of the light source of the camera 1 is the origin of the xy coordinate system, the circular cylinders P1 to P8 are arranged at positions (−3, 0), (−3, 1), (−3, 2), (−1, 3), (0, 3), (1, 3), (3, 0), (3, 1), and (3, 2) (in units of [m]). The circular cylinders P1 to P8, for example, each have a diameter of 20 [cm] and a height of 2 [m].

Figure 8:
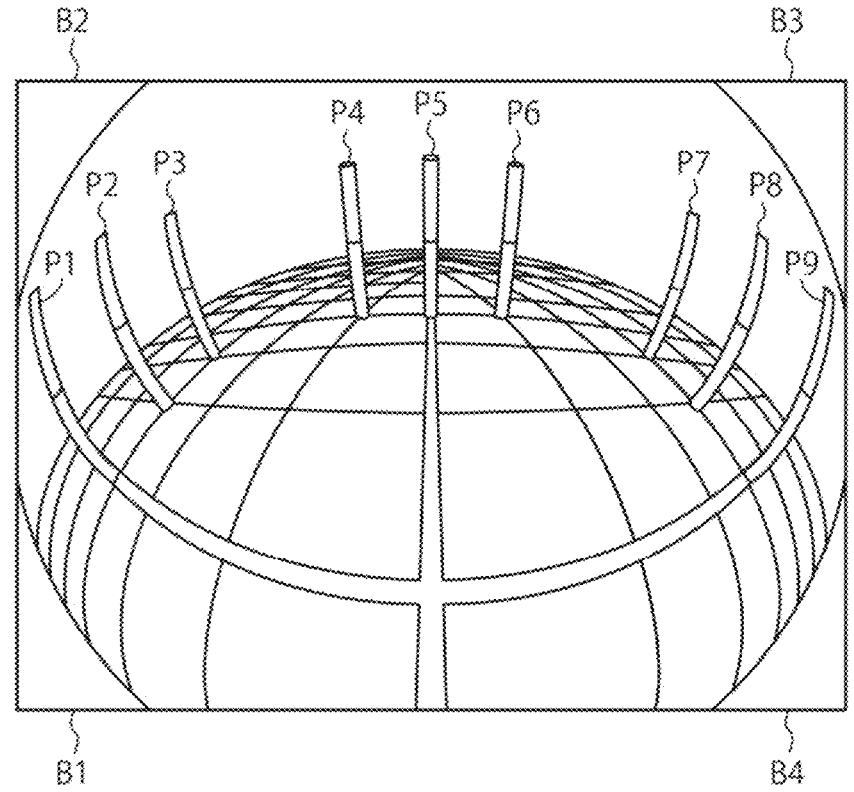
FIG. 8 is a diagram illustrating an example of an image captured by the camera in the state of FIG. 6 and FIG. 7.

FIG. 8 illustrates an example of an image captured by the camera 1 in the state of FIG. 6 and FIG. 7. This image is an image of raw image data of high image quality which image data has not been subjected to processing such as compression coding. As design values for the installation of the camera 1, the height of the camera 1 is, for example, a height of 1 [m] from the traveling surface at the center of the rear portion of the vehicle E, and the attitude of the camera 1 has a roll angle (depression angle) of 40 degrees and a yaw angle of 0 degrees. The image in the example of FIG. 8 is obtained in a case where the camera 1 is installed according to the design values. Because a wide-angle lens is used in the camera 1, the image is distorted as a whole. In the image of FIG. 8, regions B1 to B4 at four corners are regions outside an imaging range of the camera 1 and are in a specific color.

FIG. 9 illustrates examples of the map-converted images C1 to C3 obtained by converting the image of FIG. 8 by the detection purpose conversion maps M1 to M3. The map-converted image C1 is an image obtained by converting the image of FIG. 8 to the direction of the first viewpoint (virtual optical axis A1). The map-converted image C2 is an image obtained by converting the image of FIG. 8 to the direction of the second viewpoint (virtual optical axis A2). The map-converted image C3 is an image obtained by converting the image of FIG. 8 to the direction of the third viewpoint (virtual optical axis A3). The distortion of the image of FIG. 8 is removed at a time of each conversion. The removal of the distortion is reflected in the detection purpose conversion maps M1 to M3.

The optical flow detecting unit 4 in FIG. 1 is connected to the image processing unit 2. The optical flow detecting unit 4 receives the map-converted images C1 to C3 from the image processing unit 2 and detects an optical flow in each of the map-converted images C1 to C3. Specifically, by using a plurality of map-converted images C1 in time series, the optical flow detecting unit 4 detects the optical flow from the map-converted images C1. Similarly, by using a plurality of map-converted images C2 in time series, the optical flow detecting unit 4 detects the optical flow from the map-converted images C2. By using a plurality of map-converted images C3 in time series, the optical flow detecting unit 4 detects the optical flow from the map-converted images C3.

The optical flow is a vector representing an amount of movement of each corresponding point in images mutually consecutive in time series.

Figure 11:
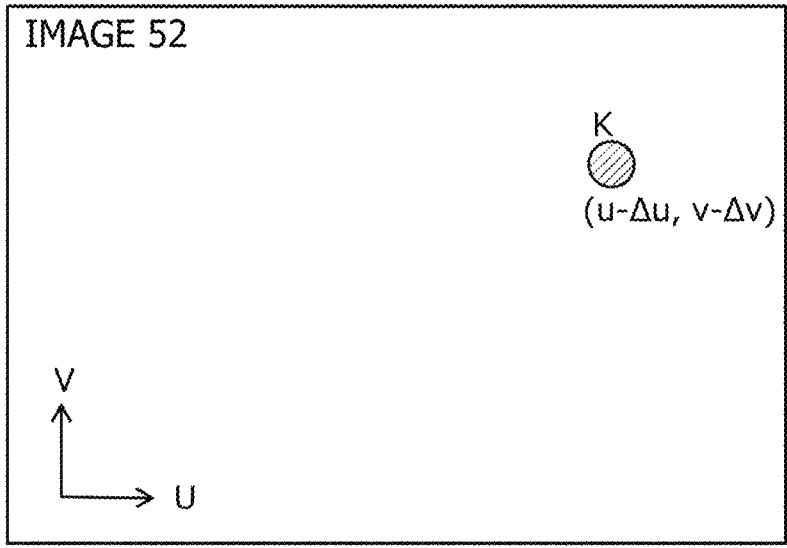
FIG. 11 is a diagram of assistance in explaining the processing of detecting the optical flow.

FIG. 10 and FIG. 11 are diagrams of assistance in explaining processing of detecting an optical flow. FIG. 9 illustrates an image 51 of a current frame and a point K in the image 51. The point K represents a freely selected object or a part of the object in the image 51. FIG. 11 illustrates an image 52 of a past frame obtained time T1 before the current frame and the point K at a position time T1 before the current frame. In FIG. 10 and FIG. 11, a V-axis is taken in an upward direction of the image, and a U-axis is taken in a right direction of the image. In addition, suppose that the center of the image is the origin of the U-axis and the V-axis. The processing of detecting the optical flow is performed by searching for a position in the image 52 from which the point in the image 51 has moved.

Suppose that the point K has moved from the image 52 to the image 51 as illustrated in FIG. 10. The position of the point K in the image 52 is (u-Δu, v-Δv), and the position of the point K in the image 51 is (u, v). (Δu, Δv) as a difference between the position of the point K in the image 51 and the position of the point K in the image 52 is the optical flow at the point K in the image 51. That is, it can also be said that the point (u, v) in the image 51 is an end point of the optical flow, and that the position (u-Δu, v-Δv) in the image 51 which position corresponds to the position (u-Δu, v-Δv) in the image 52 is a start point of the optical flow. While the description with reference to FIG. 10 and FIG. 11 has been made by using two images, three or more images may be used, and thus, a set of vectors between adjacent points of three or more points may be detected as an optical flow.

For a map-converted image CX (X is an integer of 1 to 3), the optical flow detecting unit 4 detects an optical flow(s) of one or a plurality of points in the image CX. The point(s) as a target for the detection of the optical flow(s) may be anything as long as the thing can be recognized as an object (as a tracking target).

Figure 12:
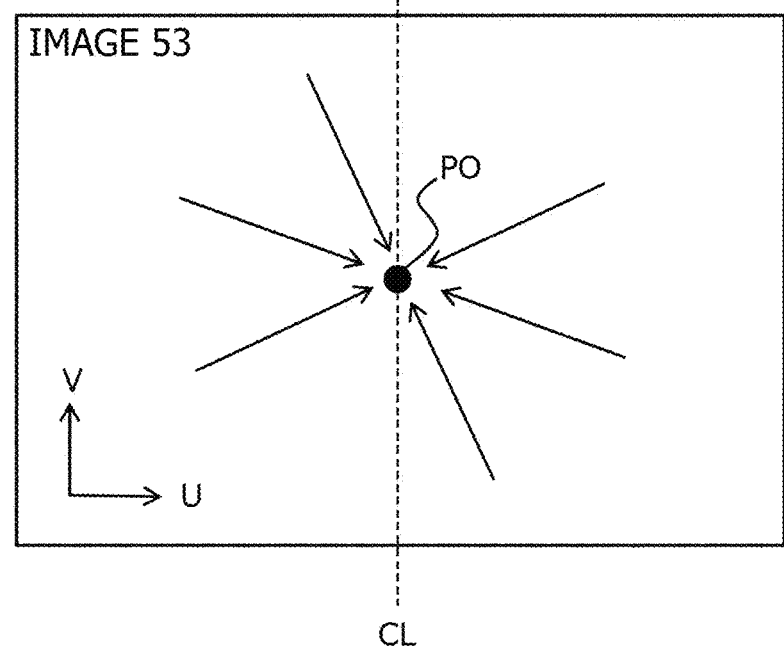
FIG. 12 is a diagram illustrating an example of detecting a plurality of optical flows.

FIG. 12 illustrates an example in which a plurality of optical flows is detected in an image 53. The plurality of optical flows directed inward (six optical flows in the example of the figure) is illustrated in the image. The plurality of optical flows converges on a line that passes through a center in the horizontal direction (U-axis direction) of the image 53 and is parallel with the V-axis. A point at which the plurality of optical flows converges corresponds to a vanishing point PO. The vanishing point PO can also be said to be a point at which straight lines obtained by extending the respective optical flows to an end point side intersect each other.

The installation error calculating unit 5 is connected to the optical flow detecting unit 4. The installation error calculating unit 5 obtains pieces of information on the optical flows detected by the optical flow detecting unit 4 for each of the map-converted images C1 to C3. The installation error calculating unit 5 calculates amounts of error in the attitude of the camera 1 by using the obtained information. Specifically, the installation error calculating unit 5 calculates an amount of displacement in the pitch angle (amount of error in the pitch angle) and an amount of displacement in the yaw angle (amount of error in the yaw angle). In the following, operation of the installation error calculating unit 5 will be described in detail.

[Calculation of Amount of Displacement in Yaw Angle]

The installation error calculating unit 5 calculates the amount of displacement in the yaw angle (amount of error in the yaw angle) with respect to the design value for the installation of the camera 1 on the basis of the pieces of information on the optical flows detected from the map-converted image C1. In a case where the vehicle travels forward (moves straight forward) in a state in which the camera 1 is installed according to the design values, optical flows converging at a point on a vertical line passing through a center in the horizontal direction of the map-converted image C1 (which vertical line will hereinafter be referred to as a vertical center line) occur in the map-converted image C1. More specifically, points in the map-converted image C1 converge at a vanishing point on the vertical center line. Incidentally, the vanishing point is not necessarily included in the map-converted image C1, but there can be a case where the vanishing point is not included in the map-converted image C1 (case where the vanishing point is present outside the map-converted image C1).

FIG. 13A illustrates an example of an image in which the vanishing point is present. FIG. 13B illustrates an example of an image in which the vanishing point is not present. The vanishing point may not be present in a case where the camera has a narrow vertical angle of view or in a case where the camera has a large depression angle, for example. Incidentally, the images of FIGS. 13A and 13B are images based on wide-angle image data (high definition raw image data) before the image captured by the camera 1 is converted.

The installation error calculating unit 5 calculates a position in the horizontal direction at which position the optical flows converge (vertical line on which the optical flows converge) in the map-converted image C1. The installation error calculating unit 5 calculates a distance between the calculated position in the horizontal direction and a central position in the horizontal direction (that is, a distance between the vertical line and the vertical center line). The distance is calculated on the basis of, for example, a difference between the U-axis coordinate of the calculated vertical line and the U-axis coordinate of the vertical center line. The difference calculated corresponds to the amount of displacement in the yaw angle. Thus, a convergence line (vertical line) of the optical flows in the map-converted image C1 is shifted from the vertical center line of the image by the amount of displacement in the yaw angle. A calculated distance of zero corresponds to a case where there is no error in the yaw angle. The installation error calculating unit 5 calculates the amount of displacement in the yaw angle which displacement amount corresponds to the distance. Letting $\Delta H$ be an amount of displacement (number of pixels) in the horizontal direction in the image, letting H be a horizontal direction output size of the image as a whole, and letting A be an output horizontal angle of view, for example, the amount of displacement $\Delta yaw$ in the yaw angle can be calculated from the following relational expression (1):

$$\tan(\Delta yaw)/\tan(A/2)=\Delta H/H \qquad (1)$$

Here, the amount of displacement in the yaw angle is calculated by use of the relational expression. However, in a case where the horizontal direction output size and the output horizontal angle of view A are determined in advance, the amount of displacement in the yaw angle may be calculated by use of the information on a look-up table or the like that associates the distance with the amount of displacement in the yaw angle.

As a method of calculating the vertical line on which the optical flows converge, an optical flow orthogonal to the U-axis (parallel with the V-axis) may be detected in the map-converted image C1, and the U-axis coordinate of the detected optical flow may be set as the position in the horizontal direction of the vertical line. Alternatively, the position of the vertical line in the horizontal direction may be estimated from one or more detected optical flows. For example, a learned neural network which receives one or more optical flows as input and outputs the U-axis coordinate of the vertical line on which the one or more optical flows converge may be used. The vertical line on which the optical flows converge may be calculated by use of another method.

[Calculation of Amount of Displacement in Pitch Angle]

The installation error calculating unit 5 calculates the amount of displacement in the pitch angle (amount of error in the pitch angle) with respect to the design value for the installation of the camera 1 on the basis of the pieces of information on the optical flows detected from the map-converted image C2. In a case where the vehicle travels forward in a state in which the camera 1 is installed according to the design values, optical flows parallel with the U-axis (perpendicular to the V-axis) of the map-converted image C2 occur in the map-converted image C2.

The installation error calculating unit 5 calculates an inclination of the optical flows with respect to the U-axis which optical flows are calculated from the map-converted image C2. In a case where the calculated inclination is zero, the amount of displacement in the pitch angle corresponds to zero (case where there is no error). The installation error calculating unit 5 calculates an amount of displacement in the pitch angle which displacement amount corresponds to the inclination. That is, the optical flows in the map-converted image C2 are inclined by an amount corresponding to the amount of displacement in the pitch angle, and therefore, the amount of displacement in the pitch angle can be obtained by detecting the inclination. Incidentally, in a case where the vertical and horizontal scales (aspect) of the output image differ, it suffices to perform conversion in consideration of an aspect ratio. In order to calculate the amount of displacement in the pitch angle, the installation error calculating unit 5 may use correspondence information of a look-up table or the like that associates the inclination with the amount of displacement in the pitch angle. Alternatively, a function may be used which receives the inclination as input, and outputs the amount of displacement in the pitch angle. One or a plurality of optical flows may be used for the calculation of the inclination. In a case of the plurality of optical flows, the displacement amount may be calculated by using a statistical value (a maximum value, a minimum value, an average value, or the like) of the inclinations of the plurality of optical flows. Alternatively, the displacement amount may be calculated from each optical flow, and a statistical value (a maximum value, a minimum value, an average value, or the like) of the calculated displacement amounts may be used. The use of the plurality of optical flows can improve accuracy of calculation of the inclination.

The installation error calculating unit 5 calculates the amount of displacement in the pitch angle (amount of error in the pitch angle) also in the case of the map-converted image C3 as in the case of the map-converted image C2. That is, the inclination of the optical flows with respect to the U-axis which optical flows are calculated from the map-converted image C3 is calculated. The installation error calculating unit 5 calculates the amount of displacement in the pitch angle which displacement amount corresponds to the inclination.

The installation error calculating unit 5 ultimately determines the amount of displacement in the pitch angle on the basis of the amounts of displacement in the pitch angle which displacement amounts are calculated from the map-converted image C2 and the map-converted image C3. For example, the larger or the smaller of the amounts of displacement in the pitch angle is used. In addition, an average or a weighted average of both the pitch angles may be used. While the amount of displacement in the pitch angle is calculated by use of both the map-converted image C2 and the map-converted image C3, the amount of displacement in the pitch angle may be calculated from only one of the map-converted image C2 and the map-converted image C3. This can reduce an amount of operation. On the other hand, when the amount of displacement in the pitch angle is calculated by using both, calculation accuracy can be improved.

In the following, a specific example of a method of calculating the amount of displacement in the yaw angle and the amount of displacement in the pitch angle will be described with reference to FIGS. 14A, 14B, 14C, 15A, 15B, 15C, 16A, 16B, 16C, 16D, 17A, 17B, 17C, 17D, 18A, 18B, 18C, and 18D.

FIGS. 14A, 14B, and 14C illustrate examples of the map-converted images C1 to C3 obtained from the image captured by the camera 1 of the vehicle E traveling forward and optical flows detected from the respective map-converted images, in a case where the camera 1 has no installation error. In the map-converted image C1, the optical flows converge on a vertical center line CL. In the map-converted images C2 and C3, the optical flows are parallel with the horizontal direction (U-axis) of the images. Thus, in the example illustrated in FIGS. 14A, 14B, and 14C, the amount of displacement in the pitch angle and the amount of displacement in the yaw angle are both zero.

FIGS. 15A, 15B, and 15C illustrate examples of the map-converted images C1 to C3 obtained from the image captured by the camera 1 of the vehicle E traveling forward and optical flows detected from the respective map-converted images, in a case where the camera 1 has installation errors of a yaw angle of three degrees and a pitch angle of three degrees. In the map-converted image C1, the optical flows converge on a vertical line EL at a position displaced from the vertical center line CL. In this case, the installation error calculating unit 5 calculates an amount of displacement in the yaw angle which displacement amount corresponds to a difference ΔH between the U-coordinate (horizontal position) of the vertical line EL and the U-coordinate (horizontal position) of the vertical center line CL. In the map-converted image C2, the optical flows inclined by θ1 from a horizontal line HL1 are detected. In this case, the installation error calculating unit 5 calculates an amount of displacement in the pitch angle which displacement amount corresponds to the inclination θ1. In the map-converted image C3, the optical flows inclined by θ2 from a horizontal line HL2 are detected. In this case, the installation error calculating unit 5 calculates an amount of displacement in the pitch angle which displacement amount corresponds to the inclination θ2.

Figure 16:
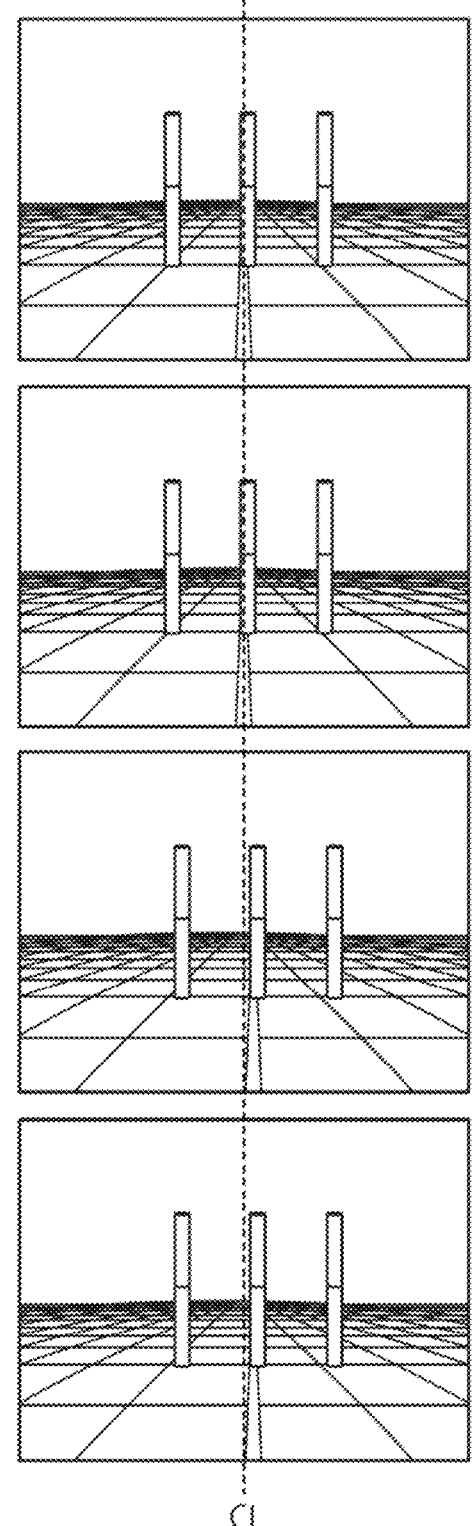
FIGS. 16A, 16B, 16C, and 16D depict diagrams illustrating a plurality of examples of a positional relation between a map-converted image C1 and a vertical center line.

FIGS. 16A, 16B, 16C, and 16D illustrate a positional relation between the map-converted image C1 and the vertical center line CL in each of FIG. 16A a case where there is no installation error, FIG. 16B a case where there is an installation error of a pitch angle of three degrees and there is no error in the yaw angle, FIG. 16C a case where there is an error of three degrees in the yaw angle and there is no error in the pitch angle, and FIG. 16D a case where there are errors of a pitch angle of three degrees and a yaw angle of three degrees. In the case where there is no installation error in FIG. 16A and in the case where there is a displacement in the pitch angle in FIG. 16B, the vertical center line CL and the vertical line (convergence line) on which the optical flows (not illustrated) converge coincide with each other. In the case where there is an error in the yaw angle in FIG. 16C and in the case where there is an error in both the yaw angle and the pitch angle in FIG. 16D, the convergence destination of the optical flows is displaced from the vertical center line CL. Thus, in the map-converted image C1, a displacement in the yaw angle can be detected independently without being affected by the pitch angle.

Figure 17:
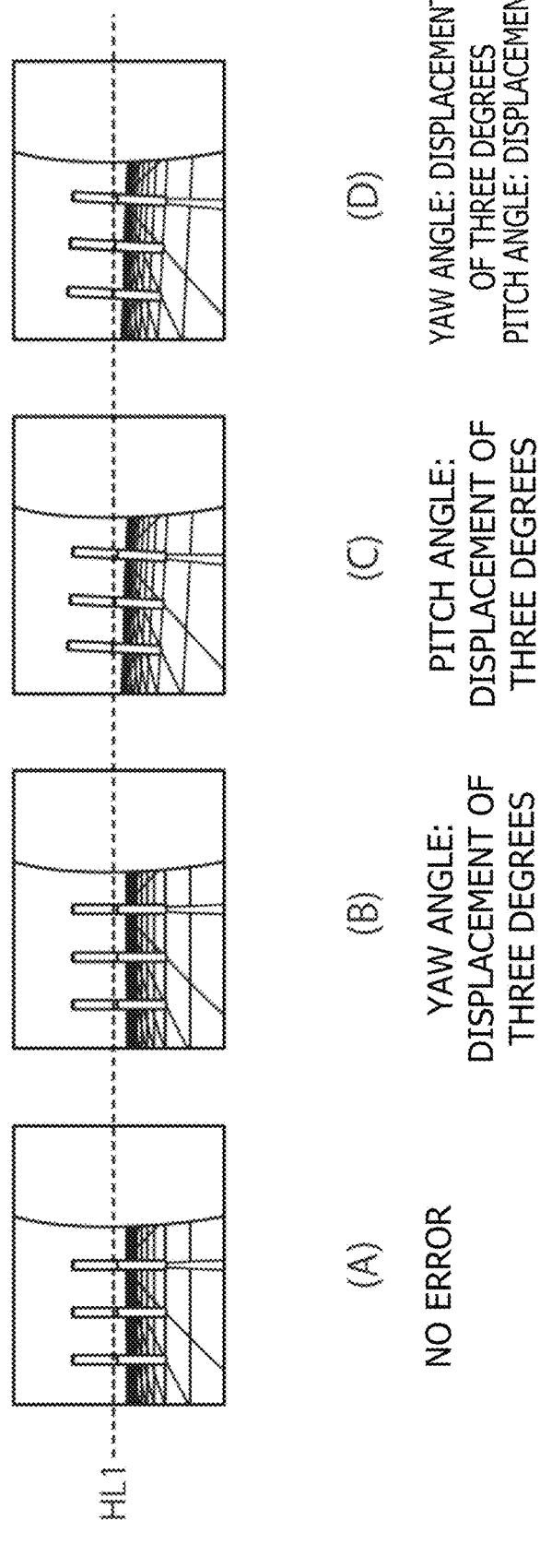
FIGS. 17A, 17B, 17C, and 17D depict diagrams illustrating a plurality of examples of a positional relation between a map-converted image C2 and a horizontal line.

FIGS. 17A, 17B, 17C, and 17D illustrate a positional relation between the map-converted image C2 and the horizontal line HL1 in each of FIG. 17A a case where there is no installation error, FIG. 17B a case where there is an installation error of a yaw angle of three degrees and there is no error in the pitch angle, FIG. 17C a case where there is an error of three degrees in the pitch angle and there is no error in the yaw angle, and FIG. 17D a case where there are errors of a yaw angle of three degrees and a pitch angle of three degrees. In the case where there is no installation error in FIG. 17A and in the case where there is a displacement in the yaw angle in FIG. 17B, the horizontal line HL1 is parallel with the optical flows (not illustrated). On the other hand, in the case where there is an error in the pitch angle in FIG. 17C and in the case where there is an error in both the yaw angle and the pitch angle in FIG. 17D, the optical flows are inclined by an angle corresponding to the error with respect to the horizontal line HL1. Thus, in the map-converted image C2, a displacement in the pitch angle can be detected independently without being affected by the yaw angle.

FIGS. 18A, 18B, 18C, and 18D illustrate a positional relation between the map-converted image C3 and the horizontal line HL2 in each of FIG. 18A a case where there is no installation error, FIG. 18B a case where there is an installation error of a yaw angle of three degrees and there is no error in the pitch angle, FIG. 18C a case where there is an error of three degrees in the pitch angle and there is no error in the yaw angle, and FIG. 18D a case where there are errors of a yaw angle of three degrees and a pitch angle of three degrees. In the case where there is no installation error in FIG. 18A and in the case where there are displacements in the yaw angle and in the pitch angle in FIG. 18B, the horizontal line HL2 is parallel with the optical flows (not illustrated). On the other hand, in the case where there is an error in the pitch angle in FIG. 18C and in the case where there is an error in both the yaw angle and the pitch angle in FIG. 18D, the optical flows are inclined by an angle corresponding to the error with respect to the horizontal line HL2. Thus, in the map-converted image C3, a displacement in the pitch angle can be detected independently without being affected by the yaw angle.

The installation error calculating unit 5 provides the map correcting unit 7 and the distance calculating unit 8 with installation error information including information on the calculated amounts of error in the attitude, that is, the amount of displacement in the yaw angle and the amount of displacement in the pitch angle.

The display purpose conversion map storage unit 6 stores a display purpose conversion map as conversion information for converting the image captured by the camera 1 into a display image for the image display unit 9. A plurality of display purpose conversion maps may be stored according to purposes of displaying an image at a time of backing the vehicle (time of parking or stopping the vehicle or the like), displaying an image of the rear at a time of forward traveling of the vehicle, and so forth. The display purpose conversion map storage unit 6 is a recording medium such as a memory device, a hard disk, or an optical disk. The memory device may be a nonvolatile memory or may be a volatile memory.

The display purpose conversion map defines which pixel of the image captured by the camera 1 is to be mapped to which pixel of a display image. The display purpose conversion map can be generated by using, for example, image geometric transformation based on parameters (external parameters and internal parameters) of the camera 1. The display purpose conversion map is created assuming a case where the camera 1 is installed according to the design values (case where there is no displacement in the pitch angle nor in the yaw angle or the like of the camera 1). The mapping between the pixels on the basis of the display purpose conversion map may be one-to-one mapping. Alternatively, a plurality of pixels of the image captured by the camera 1 may be mapped to one pixel of the display image. The display purpose conversion map may be a look-up table, or may be a function that receives, as input, the value(s) of one or more pixels in the image of the camera 1, and outputs the value of one pixel in the display image.

The map correcting unit 7 is connected to the display purpose conversion map storage unit 6 and the installation error calculating unit 5. The map correcting unit 7 reads the display purpose conversion map stored in the display purpose conversion map storage unit 6, and obtains the installation error information (information on the amount of displacement in the pitch angle and the amount of displacement in the yaw angle) from the installation error calculating unit 5. The map correcting unit 7 corrects the display purpose conversion map on the basis of the installation error information, and writes the corrected display purpose conversion map to the display purpose conversion map storage unit 6. In a case where one-to-one mapping is to be performed between the image captured by the camera 1 and the display image, for example, the display purpose conversion map is corrected by changing mapping destinations by the number of pixels corresponding to the displacement amounts. In a case where the display purpose conversion map is a function including the pitch angle and the yaw angle as parameters, the display purpose conversion map is corrected by updating the parameters of the function on the basis of the installation error information. Consequently, even in a case where the design value of the depression angle (pitch angle) of the camera 1 is 40 degrees, and an actual depression angle of the camera 1 is 45 degrees, for example, an image equivalent to that in a case where the camera 1 is installed at a depression angle of 40 degrees can be displayed.

The image processing unit 2 reads the corrected display purpose conversion map from the display purpose conversion map storage unit 6, and converts the image captured by the camera 1 into an image for display on the basis of the read display purpose conversion map. The image processing unit 2 provides the converted image to the image display unit 9. The image display unit is connected to the image processing unit 2. The image display unit displays the image provided from the image processing unit 2 on the screen. The displayed image is viewed by an occupant (user such as the driver) of the vehicle. At a time of backing the vehicle, for example, an image of a surrounding environment including a lower portion of the rear is displayed. Even in a case where there is an error in the installation of the camera 1, the occupant of the vehicle can view the image in which an image displacement caused by the installation error is corrected.

The distance calculating unit 8 is connected to the installation error calculating unit 5. The distance calculating unit 8 obtains the installation error information (information on the amount of displacement in the pitch angle and the amount of displacement in the yaw angle) calculated by the installation error calculating unit 5. In addition, the distance calculating unit 8 is connected to the image processing unit 2. The distance calculating unit 8 obtains an image for recognition processing from the image processing unit 2. The image processing unit 2 generates the image for recognition processing on the basis of the image captured by the camera 1. The image processing unit 2, for example, generates a processed image by converting the image captured by the camera 1 into an image of a desired viewpoint, and subjecting the converted image to image processing for making an object in the image readily recognized. Examples of the image processing include automatic exposure control, automatic white balance adjustment, high dynamic range synthesis, and the like. The desired viewpoint may be the same as at least one of the first to third viewpoints described earlier, or may be a viewpoint different from these viewpoints. In addition, the image captured by the camera 1 may be used for the recognition processing without being subjected to the viewpoint conversion. In addition, the image processing unit 2 may use the image for display on the image display unit 9 as the processed image for the recognition processing.

The distance calculating unit 8 recognizes an object in the image by performing the recognition processing on the processed image. The object to be recognized may be a three-dimensional object or may be a two-dimensional object. For example, there are a vehicle, a pedestrian, an obstacle, a signal, a traffic sign, a lane of a road, a curb of a sidewalk, and the like.

The distance calculating unit 8 calculates a distance to the object as object information related to the object in the processed image. In addition, the distance calculating unit 8 may calculate, as the object information, at least one of the shape of the object, the position of the object, the orientation of the object, the traveling direction of the object, the movement speed of the object, and the like. The distance calculating unit 8 may calculate the object information by using a plurality of temporally consecutive processed images.

A method of calculating an inter-vehicle distance to another vehicle as a target object will be described as an example of a method of calculation of the distance to the object by the distance calculating unit 8.

Figure 19:
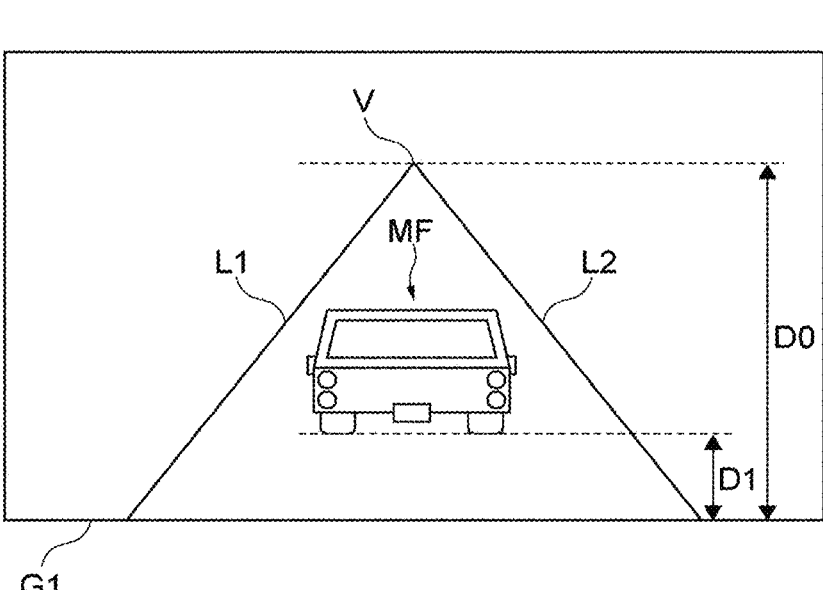
FIG. 19 is a diagram illustrating an example of a processed image generated for recognition processing by an image processing unit.

FIG. 19 illustrates an example of a processed image G generated for the recognition processing by the image processing unit 2. In the processed image G, there are illustrated another vehicle MF and two lanes L1 and L2 defining traveling lanes.

First, a vanishing point V at which the two lanes L1 and L2 intersect each other is obtained in the processed image G. Incidentally, the vanishing point V may be obtained from another object without depending on the lanes L1 and L2. For example, the vanishing point V can also be obtained by use of curbs of sidewalks, the movement trajectory of a fixed object such as a traffic sign in a plurality of processed images, or the like.

Next, the following are obtained: a distance D0 from a lower edge G1 of the processed image to the vanishing point V (dimension in the vertical direction in the image); and a distance D1 from the lower edge G1 of the processed image to the other vehicle MF (dimension in the vertical direction in the image). The inter-vehicle distance to the other vehicle MF can be obtained by use of a ratio between the distances D0 and D1, for example. An actual distance between the lanes L1 and L2 and an angle between the lanes L1 and L2 in the processed image G may be used in addition to the ratio between the distances D0 and D1. When the distance calculating unit 8 calculates the inter-vehicle distance, the distance calculating unit 8 corrects the position of the target object on the basis of the installation error information (information on the amount of displacement in the pitch angle and the amount of displacement in the yaw angle), and calculates the distance to the target object at the position after the correction. Alternatively, the distance calculating unit 8 may correct, on the basis of the installation error information, the distance to the target object which distance is calculated without using the installation error information. The actual distance between the lanes L1 and L2 may be calculated by use of highly accurate map information, or information on the actual distance between the lanes L1 and L2 may be provided in advance. The highly accurate map information may be obtained from an external server by wireless or wired communication, or the highly accurate map information may be stored in a storage unit accessible from the distance calculating unit 8.

The distance calculating unit 8 outputs the calculated distance to a processing unit in a later stage (see FIG. 21 to be described later). The calculated distance can be used for automatic driving control of the vehicle E, driving assistance, or the like. Driving assistance functions are typically ADAS (Advanced Driver Assistance System) functions including collision avoidance, impact alleviation, following driving (maintaining the inter-vehicle distance), vehicle speed maintaining driving, a collision warning, a lane deviation warning, and the like.

In the case of calculating the distance to the target object on the basis of the pixel position of the target object in the captured image, when the image is used in a state in which the installation angle of the camera deviates from a design value, the detected position of the target object may be displaced, and consequently, accuracy of the calculated distance may be degraded. The present embodiment can increase the accuracy of the calculated distance by calculating the distance to the object on the basis of the installation error information.

Figure 20:
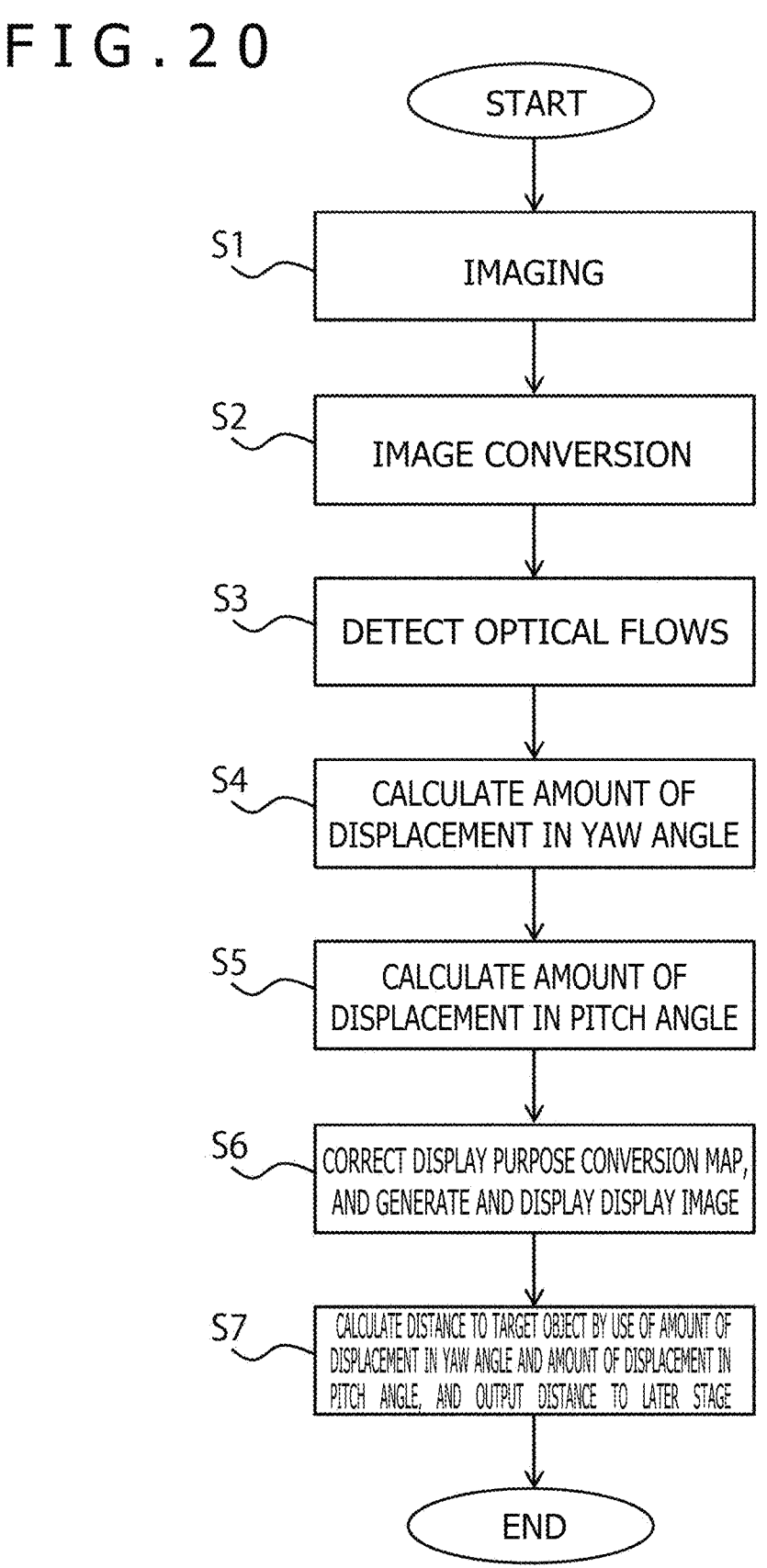
FIG. 20 is a flowchart of an example of operation of a signal processing system according to a first embodiment.

FIG. 20 is a flowchart of an example of operation of the signal processing system 100. The order of steps in the flowchart of FIG. 20 is an example. The order of steps in the flowchart may be interchanged. For example, the order of steps S4 and S5 may be interchanged. The order of steps S6 and S7 may be interchanged.

In step S1, the camera 1 captures an image at a fixed sampling rate while the vehicle E travels, and the camera 1 supplies the captured image to the image processing unit 2.

In step S2, the image processing unit 2 converts the image captured by the camera 1 into images of three viewpoints (images in the directions of the virtual optical axes A1 to A3) by using the detection purpose conversion maps M1 to M3 stored in the detection purpose conversion map storage unit 3. The image processing unit 2 thereby obtains map-converted images C1 to C3.

In step S3, the optical flow detecting unit 4 detects optical flows from the map-converted images C1 in time series, detects optical flows from the map-converted images C2 in time series, and detects optical flows from the map-converted images C3 in time series.

In steps S4 and S5, the installation error calculating unit 5 calculates amounts of error in the attitude by using the optical flows detected from the map-converted images C1 to C3. Specifically, in step S4, the installation error calculating unit 5 first calculates an amount of displacement in the yaw angle by using an optical flow detected from the map-converted images C1. For example, an optical flow in the vertical direction is detected in the images C1, and a difference between the horizontal coordinate (U-axis coordinate) of the detected optical flow and the coordinate of the vertical center line of the images C1 is calculated. The installation error calculating unit 5 calculates the amount of displacement in the yaw angle which displacement amount corresponds to the difference.

In the following step S5, the installation error calculating unit 5 calculates an amount of displacement in the pitch angle by using optical flows detected from the map-converted images C2. For example, an inclination (angle) of the optical flows detected in the images C2 with respect to the horizontal direction is calculated, and an amount of displacement in the pitch angle which displacement amount corresponds to the inclination is calculated. The installation error calculating unit 5 calculates the amount of displacement in the pitch angle also in the case of the map-converted images C3 as in the case of the map-converted images C2. The installation error calculating unit 5 determines an ultimate amount of displacement in the pitch angle on the basis of the two calculated displacement amounts. For example, a value such as an average value, a minimum value, or a maximum value of the two displacement amounts is determined. Incidentally, optical flows may be detected from only either the images C2 or the images C3, and then the amount of displacement in the pitch angle may be calculated. This can reduce an amount of operation of the installation error calculating unit 5 and shorten a processing time.

In step S6, the map correcting unit 7 corrects the display purpose conversion map stored in the display purpose conversion map storage unit 6 on the basis of the amounts of error in the attitude (information on the amount of displacement in the pitch angle and the amount of displacement in the yaw angle). The image processing unit 2 converts the image captured by the camera 1 into an image for display on the basis of the corrected display purpose conversion map. The image display unit 9 receives the image converted by the image processing unit 2 and displays the image. Thus, even in a case where there is an error in the installation of the camera 1, the occupant of the vehicle can view the image in which an image displacement caused by the installation error is corrected.

In step S7, the image processing unit 2 generates a processed image for recognition processing on the basis of the image captured by the camera 1. The distance calculating unit 8 obtains the processed image for the recognition processing from the image processing unit 2 and performs the recognition processing. The distance calculating unit 8 thereby recognizes an object in the image. The distance calculating unit 8 obtains information on the amounts of error in the attitude which amounts are calculated by the installation error calculating unit 5 (installation error information), and calculates a distance to the object in the processed image on the basis of the installation error information. For example, the distance calculating unit 8 calculates the distance to the object in the processed image without using the installation error information, and thereafter, corrects the calculated distance on the basis of the installation error information. Alternatively, the distance calculating unit 8 corrects the processed image on the basis of the installation error information, thereafter, performs the recognition processing on the basis of the processed image after the correction, and calculates the distance to the object.

As described above, according to the present embodiment, the amounts of error (amounts of displacement) in the attitude of the camera are detected by use of the optical flows in the images. It is therefore possible to detect the amounts of error in the attitude of the camera without using a calibration chart.

In addition, according to the present embodiment, the image captured by the camera is converted into an image of a viewpoint in the roll axis direction, an image of a viewpoint in the pitch axis direction, and an image of a viewpoint in the negative direction of the pitch axis, and optical flows are detected from the respective images. It is thereby possible to detect an amount of displacement in the yaw angle and an amount of displacement in the pitch angle independently of each other. In addition, a highly accurate detection is possible, and the detection is facilitated.

In addition, according to the present embodiment, a need for calculating the vanishing point in order to detect installation errors of the camera is obviated. It is therefore possible to detect the amounts of error in the attitude of the camera even in a case where the vanishing point is not present in the image (for example, in a case where the camera has a narrow vertical angle of view or in a case where the camera has a large depression angle).

First Modification

In the foregoing embodiment, description has been made of an example of operation in a case where a vehicle having a camera installed on the rear thereof is made to travel forward. However, similar processing can be performed also in a case where the vehicle is made to travel rearward. Incidentally, in this case, optical flows occur radially from the vanishing point in the image of the first viewpoint (image in the direction of the virtual optical axis A1).

Second Modification

While the camera 1 is installed on a rear portion of the vehicle, the camera may be installed on a front portion of the vehicle. Configurations and processing similar to those of the present embodiment can be implemented also in a case where the camera images a surrounding environment including the front of the vehicle.

Third Modification

The description with reference to FIG. 1 has been made supposing that the camera 1 is different from the other functional blocks. However, an optional block in the signal processing system 100 may be included in the camera 1. For example, at least a part of the processing performed by the image processing unit 2 may be performed by an image processing unit implemented on a circuit board of the camera 1. The whole of the signal processing system 100 of FIG. 1 may be configured as one apparatus. In addition, a casing including the signal processing device 101 (first casing) and a casing including the camera 1 (second casing) may be different casings. In addition, the signal processing device 101 and the camera 1 may be included in a same casing, and further included in one apparatus.

Fourth Modification

In the foregoing embodiment, a camera having a wide-angle lens is used, and an image captured by the camera is converted into images of a plurality of viewpoints. As a fourth modification, for example, a camera having a narrow angle lens may be installed on the rear of the vehicle, and as design values for the attitude of the camera, the camera optical axis and the roll axis may be parallel with the traveling direction of the vehicle and parallel with the traveling surface. In this case, the detection of the optical flows and the calculation of the amount of displacement in the yaw angle may be performed by use of the image captured by the camera without performing viewpoint conversion. Similarly, for example, a camera having a narrow angle lens may be installed on one or both of two side surfaces of the vehicle, and as design values for the attitude of the camera, the roll axis and the camera optical axis may be perpendicular to the traveling direction of the vehicle and parallel with the traveling surface. In this case, the detection of the optical flows and the calculation of the amount of displacement in the pitch angle may be performed by use of the image captured by the camera without performing viewpoint conversion.

Second Embodiment

Figure 21:
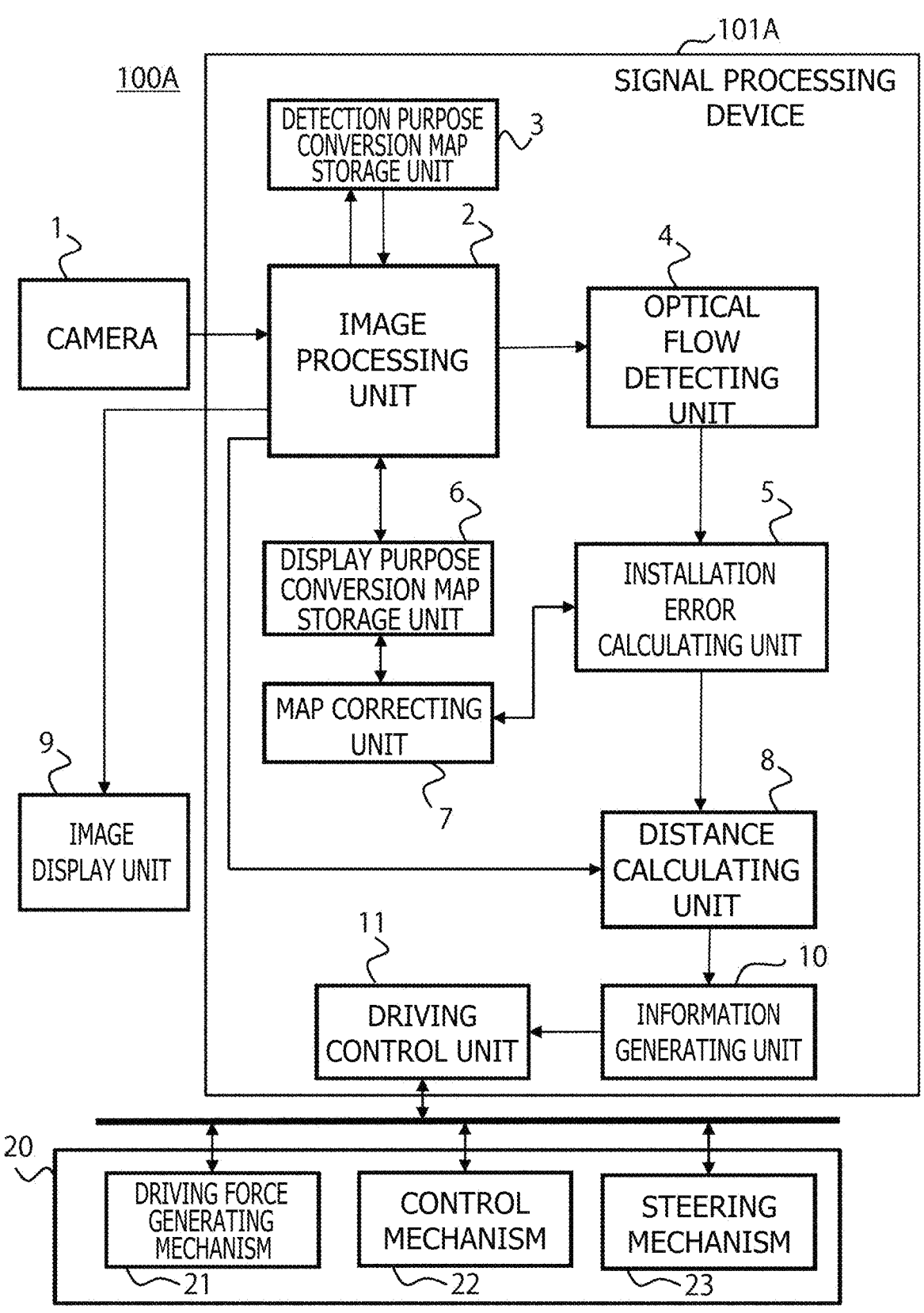
FIG. 21 is a block diagram of a signal processing system according to a second embodiment.

FIG. 21 is a block diagram of a signal processing system 100A according to a second embodiment. An information generating unit 10, a driving control unit 11, and a driving control system 20 are added to the signal processing system of FIG. 1. The information generating unit 10 and the driving control unit 11 are included in a signal processing device 101A. The signal processing system 100A controls the driving of the vehicle E by using the camera 1. The signal processing system 100A controls a driving force generating mechanism M11, a braking mechanism M12, and a steering mechanism M13 of the driving control system 20 or the like by using an image captured by the camera 1.

Functions that can be implemented by the signal processing system 100A include, for example, the driving assistance functions described above, automated driving functions, and the like. In the following, description will be made of the signal processing system 100A that can implement the driving assistance functions. Operation up to the calculation of the distance to the target object by the distance calculating unit 8 is similar to that of the first embodiment, and therefore, description thereof will be omitted.

The information generating unit 10 generates driving control information necessary for the operation of the driving control system 20 on the basis of information on the distance and the like to the target object which distance is calculated by the distance calculating unit 8. More specifically, the information generating unit 10 determines a driving to be performed by the driving control system 20 on the basis of the information about the distance and the like calculated by the distance calculating unit 8 and generates the driving control information including an instruction for this driving. The information generating unit 10 supplies the generated driving control information to the driving control unit 11. Incidentally, the information generating unit 10 may generate information other than the driving control information.

The driving to be performed by the driving control system 20 includes, for example, changing of speed (acceleration or deceleration), changing of the traveling direction, and the like. As a specific example, in a case where the inter-vehicle distance between the vehicle E and the other vehicle MF is small, for example, in a case where the inter-vehicle distance is equal to or less than a threshold value, the information generating unit 10 determines that the driving control system 20 is to be made to decelerate the vehicle E. In this case, the information generating unit 10 generates the driving control information including an instruction for deceleration, and supplies the generated driving control information to the driving control unit 11.

The driving control unit 11 generates a driving control signal on the basis of the driving control information received from the information generating unit 10, and outputs the driving control signal. The driving control unit 11 can, for example, accelerate the vehicle E by the driving force generating mechanism M11, decelerate the vehicle E by the braking mechanism M12, or change the traveling direction of the vehicle E by the steering mechanism M13.

Figure 22:
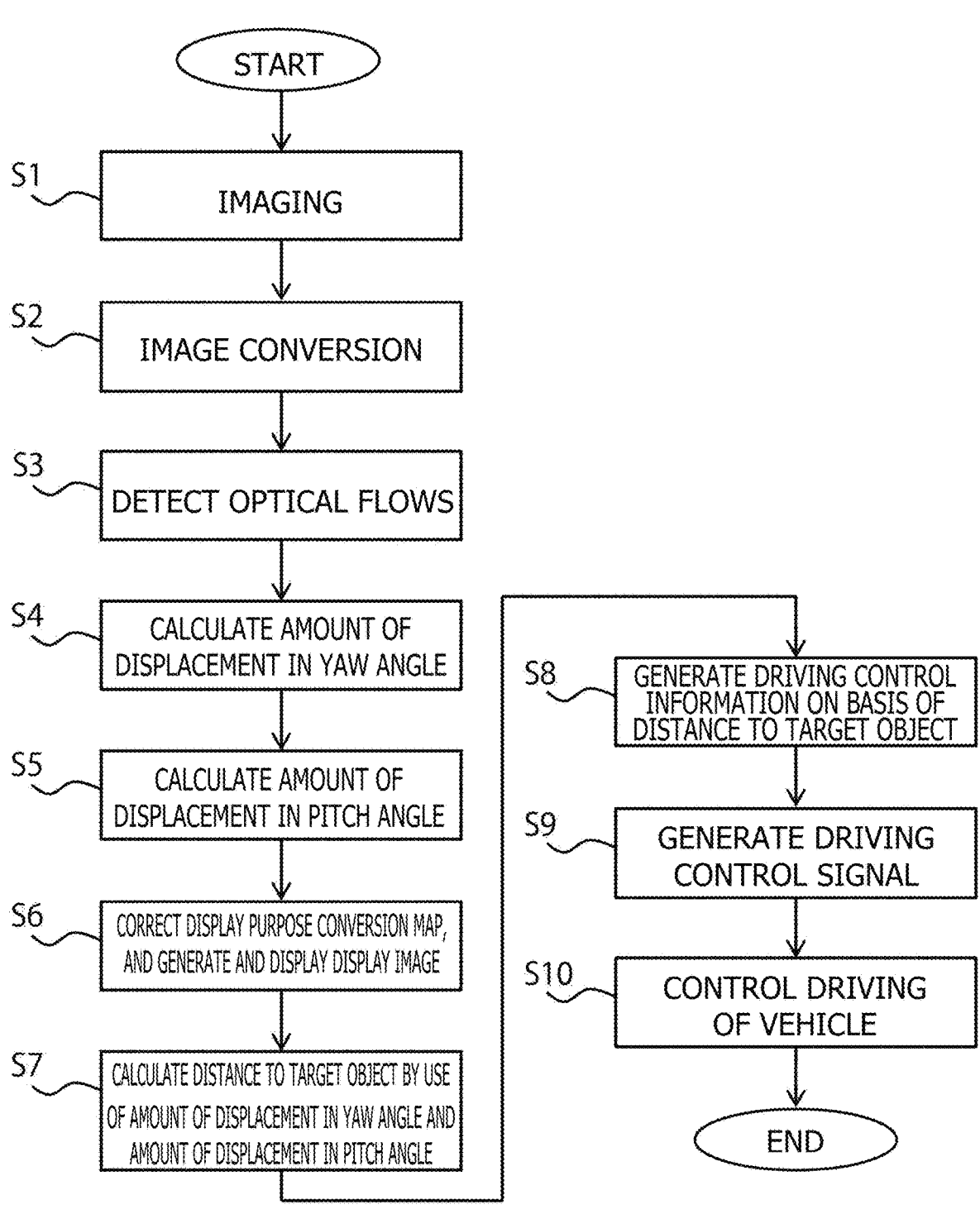
FIG. 22 is a flowchart of an example of operation of the signal processing system according to the second embodiment.

FIG. 22 is a flowchart of an example of operation of the signal processing system 100A. Steps S1 to S7 are the same as in the flowchart of FIG. 20. Step S8 and subsequent steps will therefore be described.

In step S8, the information generating unit 10 generates driving control information necessary for the operation of the driving control system 20 on the basis of the information on the distance and the like to the target object which distance is calculated by the distance calculating unit 8.

In step S9, the driving control unit 11 generates a driving control signal on the basis of the driving control information received from the information generating unit 10 and outputs the driving control signal to the driving control system 20.

In step S10, the driving control system 20 controls the driving of the vehicle. For example, the driving force generating mechanism M11 accelerates the vehicle E. Alternatively, the braking mechanism M12 decelerates the vehicle E. Alternatively, the steering mechanism M13 changes the traveling direction of the vehicle E.

First Modification

In the foregoing embodiment, description has been made of an example of operation in a case where a vehicle having a camera installed on the rear thereof is made to travel forward. However, similar processing can be performed also in a case where the vehicle is made to travel rearward. Incidentally, in this case, optical flows occur radially from the vanishing point in the image of the first viewpoint (image in the direction of the virtual optical axis A1).

Second Modification

While the camera 1 is installed on a rear portion of the vehicle, the camera may be installed on a front portion of the vehicle. Configurations and processing similar to those of the present embodiment can be implemented also in a case where the camera images a surrounding environment including the front of the vehicle.

Third Modification

The description with reference to FIG. 1 has been made supposing that the camera 1 is different from the other functional blocks. However, an optional block in the signal processing system 100A may be included in the camera 1. For example, at least a part of the processing performed by the image processing unit 2 may be performed by an image processing unit implemented on a circuit board of the camera 1. The whole of the signal processing system 100A of FIG. 21 may be configured as one apparatus. In addition, a casing including the signal processing device 101A (first casing) and a casing including the camera 1 (second casing) may be different casings. In addition, the signal processing device 101A and the camera 1 may be included in a same casing and further included in one apparatus.

Fourth Modification

In the foregoing embodiment, a camera having a wide-angle lens is used, and an image captured by the camera is converted into images of a plurality of viewpoints. As a fourth modification, for example, a camera having a narrow angle lens may be installed on the rear of the vehicle, and as design values for the attitude of the camera, the camera optical axis and the roll axis may be parallel with the traveling direction of the vehicle and parallel with the traveling surface. In this case, the detection of the optical flows and the calculation of the amount of displacement in the yaw angle may be performed by use of the image captured by the camera without performing viewpoint conversion. Similarly, for example, a camera having a narrow angle lens may be installed on one or both of two side surfaces of the vehicle, and as design values for the attitude of the camera, the roll axis and the camera optical axis may be perpendicular to the traveling direction of the vehicle and parallel with the traveling surface. In this case, the detection of the optical flows and the calculation of the amount of displacement in the pitch angle may be performed by use of the image captured by the camera without performing viewpoint conversion.

It is to be noted that the foregoing embodiments represent an example for embodying the present disclosure and that the present disclosure can be carried out in various other modes. For example, various modifications, replacements, omissions, or combinations thereof are possible without departing from the spirit of the present disclosure. Modes obtained by making such modifications, replacements, omissions, and the like are also included in the scope of the present disclosure and are similarly included in the invention described in claims and the equivalent scope thereof.

In addition, effects of the present disclosure which effects are described in the present specification are merely illustrative, and there may be other effects.

Note that the present disclosure can also take the following configurations.

(Item 1) A signal processing device including:

an optical flow detecting unit configured to detect an optical flow on the basis of an image captured by an imaging device installed on a vehicle; and an installation error calculating unit configured to calculate an amount of error in attitude of the imaging device on the basis of information on the optical flow.

(Item 2) The signal processing device according to Item 1, in which the installation error calculating unit calculates the amount of error in the attitude on the basis of a position at which the optical flow converges in a horizontal direction of the image.

(Item 3) The signal processing device according to Item 2, in which the optical flow detecting unit detects the optical flow in a vertical direction in the image, and the installation error calculating unit calculates the amount of error in the attitude on the basis of a position in the horizontal direction of the optical flow in the vertical direction.

(Item 4) The signal processing device according to Item 2 or 3, including:

an image processing unit configured to convert the image from a light source of the imaging device to an image of a first viewpoint, in which the optical flow detecting unit detects the optical flow on the basis of the image of the first viewpoint.

(Item 5) The signal processing device according to Item 4, in which the light source of the imaging device is oriented in a direction rotated about a yaw axis of the imaging device, and the first viewpoint is directed in a direction of a roll axis of the imaging device.

(Item 6) The signal processing device according to Item 5, in which the roll axis is parallel with a traveling direction of the vehicle and parallel with a traveling surface of the vehicle in a case where the imaging device is installed in a state in which there is no error in the attitude.

(Item 7) The signal processing device according to any one of Items 1 to 6, in which the amount of error in the attitude includes an amount of error in a yaw angle of the imaging device.

(Item 8) The signal processing device according to any one of Items 1 to 7, in which the installation error calculating unit calculates the amount of error in the attitude on the basis of an inclination of the optical flow in the image.

(Item 9) The signal processing device according to any one of Items 1 to 8, including:

an image processing unit configured to convert the image from a light source of the imaging device to an image of a second viewpoint, in which the optical flow detecting unit detects the optical flow on the basis of the image of the second viewpoint.

(Item 10) The signal processing device according to Item 9, in which the light source of the imaging device is oriented in a direction rotated about a pitch axis of the imaging device, and the second viewpoint is directed in a direction of the pitch axis of the imaging device.

(Item 11) The signal processing device according to any one of Items 1 to 10, in which the amount of error in the attitude includes an amount of error in a pitch angle of the imaging device.

(Item 12) The signal processing device according to Item 11, in which the pitch axis is parallel with a direction perpendicular to a traveling direction of the vehicle and is parallel with a traveling surface of the vehicle in a case where the imaging device is installed in a state in which there is no error in the attitude.

(Item 13) The signal processing device according to any one of Items 9 to 12, in which the image processing unit converts the image from the light source of the imaging device to an image of a third viewpoint in an opposite direction to the second viewpoint, the optical flow detecting unit detects the optical flow on the basis of the image of the third viewpoint, and the installation error calculating unit calculates the amount of error in the attitude on the basis of information on the optical flow in the image of the second viewpoint and information on the optical flow in the image of the third viewpoint.

(Item 14) The signal processing device according to any one of Items 1 to 13, including:

an image processing unit configured to correct the image on the basis of the amount of error in the attitude and generate a display image to be displayed on an image display unit.

(Item 15) The signal processing device according to Item 14, including:

a map correcting unit configured to correct conversion information for converting the image into the display image on the basis of the amount of error in the attitude, in which the image processing unit generates the display image by converting the image on the basis of the corrected conversion information.

(Item 16) The signal processing device according to any one of Items 1 to 15, including:

an image processing unit configured to generate a processed image on the basis of the image; and a distance calculating unit configured to calculate a distance to a target object included in the processed image on the basis of the processed image and the amount of error in the attitude.

(Item 17) The signal processing device according to any one of Items 1 to 16, including:

the imaging device.

(Item 18) The signal processing device according to Item 17, including:

a first casing including the image processing unit and the installation error calculating unit; and a second casing including the imaging device, in which the first casing is a casing different from the second casing.

(Item 19) A signal processing method including:

detecting an optical flow on the basis of an image captured by an imaging device installed on a vehicle; and calculating an amount of error in attitude of the imaging device on the basis of information on the optical flow.

(Item 20) A signal processing system including:

an imaging unit installed on a vehicle;

an optical flow detecting unit configured to detect an optical flow on the basis of an image captured by an imaging device installed on the vehicle;

an installation error calculating unit configured to calculate an amount of error in attitude of the imaging unit on the basis of information on the optical flow;

an image generating unit configured to generate a display image on the basis of the amount of error in the attitude and the image captured by the imaging unit; and an image display unit configured to display the display image.

REFERENCE SIGNS LIST

E: Vehicle
1: Camera
2: Image processing unit
3: Detection purpose conversion map storage unit
4: Optical flow detecting unit
5: Installation error calculating unit
6: Display purpose conversion map storage unit
7: Map correcting unit
8: Distance calculating unit
9: Image display unit
10: Information generating unit
11: Driving control unit
20: Driving control system
32: Camera optical axis
34: Horizontal line
5: Image
52: Image
53: Image
100: Signal processing system
100A: Signal processing system
101: Signal processing device
101A: Signal processing device

The invention claimed is:

1. A signal processing device, comprising:

an image processing unit configured to convert an image from a light source of an imaging device to a first image of a first viewpoint, wherein the imaging device is on a vehicle, the light source of the imaging device is oriented in a direction rotated about a yaw axis of the imaging device, and the first viewpoint is directed in a direction of a roll axis of the imaging device;

an optical flow detecting unit configured to detect an optical flow based on the first image of the first viewpoint; and an installation error calculating unit configured to calculate an amount of error in attitude of the imaging device based on information on the optical flow, wherein the information includes a position at which the optical flow converges in a horizontal direction of the image.

2. The signal processing device according to claim 1, wherein the optical flow detecting unit is further configured to detect the optical flow in a vertical direction in the image.

3. The signal processing device according to claim 1, wherein the roll axis is parallel with a traveling direction of the vehicle and parallel with a traveling surface of the vehicle, and the imaging device is in a state in which there is no error in the attitude.

4. The signal processing device according to claim 1, wherein the amount of error in the attitude includes an amount of error in a yaw angle of the imaging device.

5. The signal processing device according to claim 1, wherein the installation error calculating unit is further configured to calculate the amount of error in the attitude based on an inclination of the optical flow in the image.

6. The signal processing device according to claim 5, wherein:

the image processing unit is further configured to convert the image from the light source of the imaging device to a second image of a second viewpoint, and the optical flow detecting unit is further configured to detect the optical flow based on the second image of the second viewpoint.

7. The signal processing device according to claim 6, wherein the light source of the imaging device is oriented in a direction rotated about a pitch axis of the imaging device, and the second viewpoint is directed in a direction of the pitch axis of the imaging device.

8. The signal processing device according to claim 7, wherein the pitch axis is:

parallel with a direction perpendicular to a traveling direction of the vehicle, and parallel with a traveling surface of the vehicle, and the imaging device is in a state in which there is no error in the attitude.

9. The signal processing device according to claim 7, wherein the amount of error in the attitude includes an amount of error in a pitch angle of the imaging device.

10. The signal processing device according to claim 6, wherein the image processing unit is further configured to convert the image from the light source of the imaging device to a third image of a third viewpoint, the third viewpoint is in an opposite direction to the second viewpoint, the optical flow detecting unit is further configured to detect the optical flow based on the third image of the third viewpoint, and the installation error calculating unit is further configured to calculate the amount of error in the attitude based on information on the optical flow in the second image of the second viewpoint, and information on the optical flow in the third image of the third viewpoint.

11. The signal processing device according to claim 1, wherein the image processing unit is further configured to;

correct the image based on the amount of error in the attitude; and generate a display image for display on an image display unit.

12. The signal processing device according to claim 11, further comprising:

a map correcting unit configured to correct conversion information for conversion of the image into the display image based on the amount of error in the attitude, wherein the image processing unit is further configured to generate the display image, by the conversion of the image, based on the corrected conversion information.

13. The signal processing device according to claim 1, further comprising:

a distance calculating unit configured to calculate a distance to a target object included in a processed image, based on the processed image and the amount of error in the attitude, wherein the image processing unit is further configured to generate the processed image based on the image captured by the imaging device.

14. The signal processing device according to claim 1, further comprising the imaging device.

15. The signal processing device according to claim 14, further comprising:

a first casing including the optical flow detecting unit and the installation error calculating unit; and a second casing including the imaging device, wherein the first casing is different from the second casing.

16. A signal processing method, comprising:

converting an image from a light source of an imaging device to a first image of a first viewpoint, wherein the imaging device on a vehicle, the light source of the imaging device is oriented in a direction rotated about a yaw axis of the imaging device, and the first viewpoint is directed in a direction of a roll axis of the imaging device;

detecting an optical flow based on the first image of the first viewpoint; and calculating an amount of error in attitude of the imaging device based on information on the optical flow, wherein the information includes a position at which the optical flow converges in a horizontal direction of the image.

17. A signal processing system, comprising:

an imaging unit on a vehicle;

an image processing unit configured to convert an image from a light source of the imaging unit to a first image of a first viewpoint, wherein the imaging unit on the vehicle, the light source of the imaging unit is oriented in a direction rotated about a yaw axis of the imaging unit, and the first viewpoint is directed in a direction of a roll axis of the imaging unit;

an optical flow detecting unit configured to detect an optical flow based on the first image of the first viewpoint;

an installation error calculating unit configured to calcu-
late an amount of error in attitude of the imaging unit
based on information on the optical flow, wherein
the information includes a position at which the optical
flow converges in a horizontal direction of the 5
image;
an image generating unit configured to generate a display
image based on
the amount of error in the attitude, and
the image captured by the imaging unit; and 10
an image display unit configured to display the display
image.

\* \* \* \* \*